US010380534B2

(12) United States Patent
Khasis

(10) Patent No.: US 10,380,534 B2
(45) Date of Patent: Aug. 13, 2019

(54) AUTONOMOUS SUPPLY AND DISTRIBUTION CHAIN

(71) Applicant: Route4Me, Inc., Fort Lee, NJ (US)

(72) Inventor: Dan Khasis, Fort Lee, NJ (US)

(73) Assignee: Route4Me, Inc., Fort Lee, NJ (US)

(*) Notice: Subject to any disclaimer, the term of this patent is extended or adjusted under 35 U.S.C. 154(b) by 0 days.

(21) Appl. No.: 15/849,643

(22) Filed: Dec. 20, 2017

(65) Prior Publication Data

US 2018/0158020 A1 Jun. 7, 2018

Related U.S. Application Data

(63) Continuation-in-part of application No. 15/456,521, filed on Mar. 11, 2017, now Pat. No. 9,792,575, and a continuation-in-part of application No. 15/599,426, filed on May 18, 2017, now Pat. No. 9,792,567, and a continuation-in-part of application No. 15/673,394, filed on Aug. 9, 2017.

(60) Provisional application No. 62/436,449, filed on Dec. 20, 2016, provisional application No. 62/307,402, filed on Mar. 11, 2016, provisional application No. (Continued)

(51) Int. Cl.
*G06Q 10/08* (2012.01)
*G01C 21/34* (2006.01)
*G06Q 30/02* (2012.01)

(52) U.S. Cl.
CPC ....... *G06Q 10/0833* (2013.01); *G01C 21/343* (2013.01); *G01C 21/3415* (2013.01); *G01C 21/3453* (2013.01); *G06Q 10/087* (2013.01); *G06Q 30/0202* (2013.01)

(58) Field of Classification Search
CPC .......... G06Q 10/0833; G06Q 30/0202; G06Q 10/087; G01C 21/3415; G01C 21/343; G01C 21/3453
See application file for complete search history.

(56) References Cited

U.S. PATENT DOCUMENTS 5,958,012 A 9/1999 Battat
6,256,577 B1 7/2001 Graunke
(Continued)

OTHER PUBLICATIONS

Augus Loten, MIT Team Uses Big Data, IoT to Speed Up 'Last Mile' Deliveries, CIO Journal, Mar. 23, 2016.

*Primary Examiner* — Hussein Elchanti
(74) *Attorney, Agent, or Firm* — Ricky Lam

(57) ABSTRACT

Methods and systems for an autonomous supply and distribution chain management network are disclosed. A server may control and coordinate the processes involved in distributing a product from suppliers to the customers, including generation of purchase orders and payment of invoices. A defined set of interactions may occur in a particular sequence and at designated times that may permit the chain to be synchronized between a customer and a supplier. Unlike a regular supply and distribution chain, in which human beings decide vehicle or asset compatibility types, the autonomous chain of the present invention may maintain a compatibility database within the platform, as well as detailed information about each asset and how it can function interactively with the others. The invention may also allow for dynamic modification of transit operations to alter one or more destinations of the inventory while it is in transit to a new location at any time.

8 Claims, 17 Drawing Sheets

Related U.S. Application Data

62/338,487, filed on May 18, 2016, provisional application No. 62/372,313, filed on Aug. 9, 2016, provisional application No. 62/436,449, filed on Dec. 20, 2016.

(56) References Cited

U.S. PATENT DOCUMENTS

| | | |
|---|---|---|
| 8,275,508 B1 | 9/2012 | Adams |
| 8,374,781 B2 | 2/2013 | Hartman |
| 8,825,395 B2 | 9/2014 | Boss |
| 8,977,481 B1 | 3/2015 | Downs |
| 9,140,567 B2 | 9/2015 | Fryer |
| 2003/0149644 A1* | 8/2003 | Stingel, III ............ G06Q 10/08 705/28 |
| 2004/0030572 A1 | 2/2004 | Campbell |
| 2006/0031007 A1 | 2/2006 | Agnew |
| 2007/0155404 A1 | 7/2007 | Yamane |
| 2009/0276153 A1 | 11/2009 | Lee |
| 2010/0205022 A1 | 8/2010 | Brown |
| 2010/0312466 A1 | 12/2010 | Katzer |
| 2010/0332121 A1 | 12/2010 | Okude |
| 2014/0095309 A1 | 4/2014 | Macneille |
| 2014/0330741 A1* | 11/2014 | Bialynicka-Birula ...................... G06Q 10/0838 705/341 |
| 2015/0032366 A1 | 1/2015 | Man |
| 2015/0371178 A1* | 12/2015 | Abhyanker .......... G06Q 10/083 705/330 |
| 2016/0071050 A1* | 3/2016 | Kaye .................... G06Q 10/083 705/15 |
| 2016/0117871 A1 | 4/2016 | Mcclellan |
| 2016/0379168 A1 | 12/2016 | Foerster |
| 2017/0043953 A1* | 2/2017 | Battles ................ B65G 1/1373 |
| 2017/0083862 A1* | 3/2017 | Loubriel ............ G06Q 10/0835 |
| 2017/0110017 A1* | 4/2017 | Kimchi ................ G08G 5/0069 |
| 2017/0123421 A1* | 5/2017 | Kentley ................ G01C 21/26 |
| 2017/0221072 A1* | 8/2017 | AthuluruTlrumala ...................... G06Q 30/014 |
| 2017/0262790 A1* | 9/2017 | Khasis ............... G01C 21/3461 |
| 2017/0308852 A1* | 10/2017 | Beach-Drummond ...................... G01C 21/34 |
| 2017/0341513 A1* | 11/2017 | Wu ........................ B60K 35/00 |

* cited by examiner

AUTONOMOUS SUPPLY AND DISTRIBUTION CHAIN

CLAIMS OF PRIORITY

This patent application is a continuation-in-part and claims priority from:
(1) U.S. utility patent application Ser. No. 15/456,521, entitled 'Complex dynamic route sequencing for multi-vehicle fleets using traffic and real-world constraints' filed on Mar. 11, 2017, which claims benefit of U.S. provisional patent application No. 62/307,402, entitled 'Complex dynamic route sequencing for multi-vehicle fleets using traffic and real-world constraints', filed Mar. 11, 2016.
(2) U.S. utility patent application Ser. No. 15/599,426, entitled 'Methods and systems for managing large asset fleets through a virtual reality interface', filed on May 18, 2017, which claims benefit of U.S. provisional patent application No. 62/338,487, entitled 'Method and system for managing large vehicle fleets through a virtual reality environment', filed May 18, 2016.
(3) U.S. utility patent application Ser. No. 15/673,394, entitled 'Methods and systems for detecting and verifying route deviations', filed on Aug. 9, 2017, which claims benefit of U.S. provisional patent application No. 62/372,313, entitled 'Methods and systems for detecting and verifying route deviations', filed Aug. 9, 2016.
(4) U.S. provisional patent application No. 62/436,449, entitled 'Autonomous supply and distribution chain', filed Dec. 20, 2016.

FIELD OF TECHNOLOGY

This disclosure relates generally to techniques for intelligent autonomous supply and distribution chain network, which centralizes many operations including management of the movement of inventory through the chain.

BACKGROUND

A supply and distribution chain can refer to a system or group of entities, activities, information, and/or assets involved in the delivery of products or services from a supplier to a customer. Activities can involve some transformation of raw materials or data into a finished product or service that can ultimately be delivered or otherwise provided to an end user. The chain can exist within a single entity or across various business entities within, e.g., a particular product or service industry.

Modern channels of trade, including international supply and distribution chains, are often highly complex, span thousands of miles and multiple transportation modes and convey valuable goods from sources to destinations all over the world. A typical supply and distribution chain often begins at a manufacturing plant, where goods are fabricated and loaded into shipping containers for transportation by truck or train to a sea port. At the port, the shipping containers are loaded onto ships and transported across various bodies of water. Once they reach their destination, the ships are unloaded, and the shipping containers again are shipped over land by truck or train to one or more rail yards, and then to distribution centers. The goods are then typically broken up into smaller lots, perhaps into separate pallets or boxes and loaded onto trucks for their final destinations, which are often retail stores, customer locations, or other manufacturing plants.

Currently, expensive and labor-intensive tracking systems exist for identifying and locating goods in such chains. However, these systems fail to offer end-to-end transit operation optimization and require excessive human intervention and maintenance, severely diminishing their effectiveness. Various conventional asset tracking systems are able to cover only portions of a chain, and typically handle many functions as completely independent events without communication (and with human operators). For example, fulfillment may be handled independently of supplier payments, or even order management. In addition, many dates are manually entered, tracked and changed according to the expected delivery status of the product ordered. This is a very costly and time consuming task as the sequence of information, products, and currency can change depending upon the needs of the specific customers, suppliers and logistics providers that are using the network. Suppliers and customers often find themselves paying higher prices, being short of products in times of high demand, forecasting needs inaccurately, and creating slow moving inventories because these legacy systems and methods do not have the resources or time to manage their supply and distribution chain properly. There is a need for an autonomous supply and distribution chain management system that can provide detailed information about each asset and how it can function interactively with the other assets in the supply chain, and optimizes transit operations based on the asset compatibilities and various constraints.

SUMMARY

In one aspect, the present invention discloses a system and a method for autonomous detection of asset compatibility based on a target transit operation, and to optimize a route based on the compatibility data. Unlike a regular supply and distribution chain, in which human beings decide vehicle or asset compatibility types, e.g., drivers, roads, buildings, marine ships, and load docks, the autonomous supply and distribution chain of the present invention may maintain a centralized asset compatibility database within the platform, as well as detailed information about each asset and how it can function interactively with the other assets in the supply and distribution chain. For example, the autonomous supply and distribution chain may mix asset classes, such as a human driven vehicle that delivers or picks up from a fully autonomous warehouse, or vice versa, such as a fully autonomous vehicle that delivers or picks up from a human operated warehouse. In the event that various assets are misclassified or are determined to be incompatible during the execution phase in the supply and distribution chain, the system and the method may compensate using various methods and access sensors present on each machine in the chain, such as, e.g., machine vision, fuzzy logic, risk analysis and scoring, as a fallback to try to complete the necessary step. An optimization algorithm may compute and determine the combination or mixture such that the logistics operation is maximized, and may involve dynamically updating and changing the combination or mixture as new data are received and analyzed while the transit operation is in progress. Asset compatibility specifications may be defined by the manufacturer of the asset, and may be overridden by the administrator. The autonomous platform may use artificial intelligence to reconfigure itself and re-coordinate all the assets in its control to fully maximize the efficiency of the supply and distribution chain, including running its own multivariate experiments unknown to human operators, making modifications to these experiments over time based on quantitative, qualitative, and other types of logic. The system and the method may use artificial intelligence to predict which autonomous supply and distribution chain assets are likely to underperform based on available data, such as, e.g., telematics data, sensor data, onboard diagnostics data, recent exposure to hazardous road conditions, and a series of inclement weather events.

In another aspect, the present invention discloses a system and a method for providing inventory location identification, and dynamic modification of transit operations or routes to alter one or more destinations of the inventory while it is in transit to a new location at any time. Dynamic modification may increase performance where it matters in the supply and distribution chain by adding flexibility into the system such that delays occurring from unexpected events are minimized. For example, an unforeseen weather event may prevent a particular asset from completing its delivery job; however, the system may autonomously and dynamically modify the route to allow for another asset not impacted by the weather event to deliver a same or similar item do the end user. Due to the rapid and fluid environment of modern warehouses and transportation services, workers often receive instructions to change the destination of inventory that has already been received and is in the process of being transferred to another location. However, once the inventory has been picked-up from its original location, it may not be possible previously to determine the vehicle used for transport and its current location until the inventory arrives at a warehouse and/or until an inventory database is updated. In a busy delivery or supply and distribution chain environment, this can result in substantial delays and inefficiencies due to the inability to rapidly locate inventory and respond to urgent stock needs or change of transfer orders.

In yet another aspect, the present invention discloses a system and a method for an autonomous supply and distribution chain management network. A supply and distribution chain may be any and all activities associated with defining, designing, producing, receiving, delivering, monitoring, storing and using the components and sub-components used in manufacturing a product. A server may control and coordinate the processes involved in distributing the product from suppliers to the customers, including generation of purchase orders and payment of invoices. Once a product is qualified, a defined set of interactions may occur in a particular sequence and at designated times that may permit the supply and distribution chain to be synchronized between a customer and a supplier. Such a well synchronized chain may comprise minimal inventories and short reaction times to efficiently handle transfer order changes. The network may comprise modules pertaining to various aspects and operations of a supply and distribution chain communicatively coupled to a centralized server, and may include, e.g., sourcing, procurement, conversion, logistic, and collaboration. The server may manage individual modules independently or simultaneously such that there is coordination in the supply and distribution chain network. For example, the supply and distribution chain network may connect actors having various roles, such as, e.g., dock workers, longshoreman, field agents, customs agents, freight forwarders, customers, suppliers, logistics providers, carriers and financial institutions. The system and the method of the present invention may create a network which supports customers requesting a same or similar product, and may realize lower costs and increased flexibility even in changing supply demands.

BRIEF DESCRIPTION OF THE DRAWINGS

Example embodiments are illustrated by way of example and are not limited to the figures of the accompanying drawings, in which, like references indicate similar elements.

DETAILED DESCRIPTION

Disclosed are systems and methods for autonomous optimization of supply and distribution chain transit operations, including management of the movement of inventory through the chain. Although the present embodiments have been described with reference to specific example embodiments, it will be evident that various modifications and changes may be made to these embodiments without departing from the broader spirit and scope of the various embodiments. In addition, the components shown in the figures, their connections, couples, and relationships, and their functions, are meant to be exemplary only, and are not meant to limit the embodiments described herein.

Figure 1:
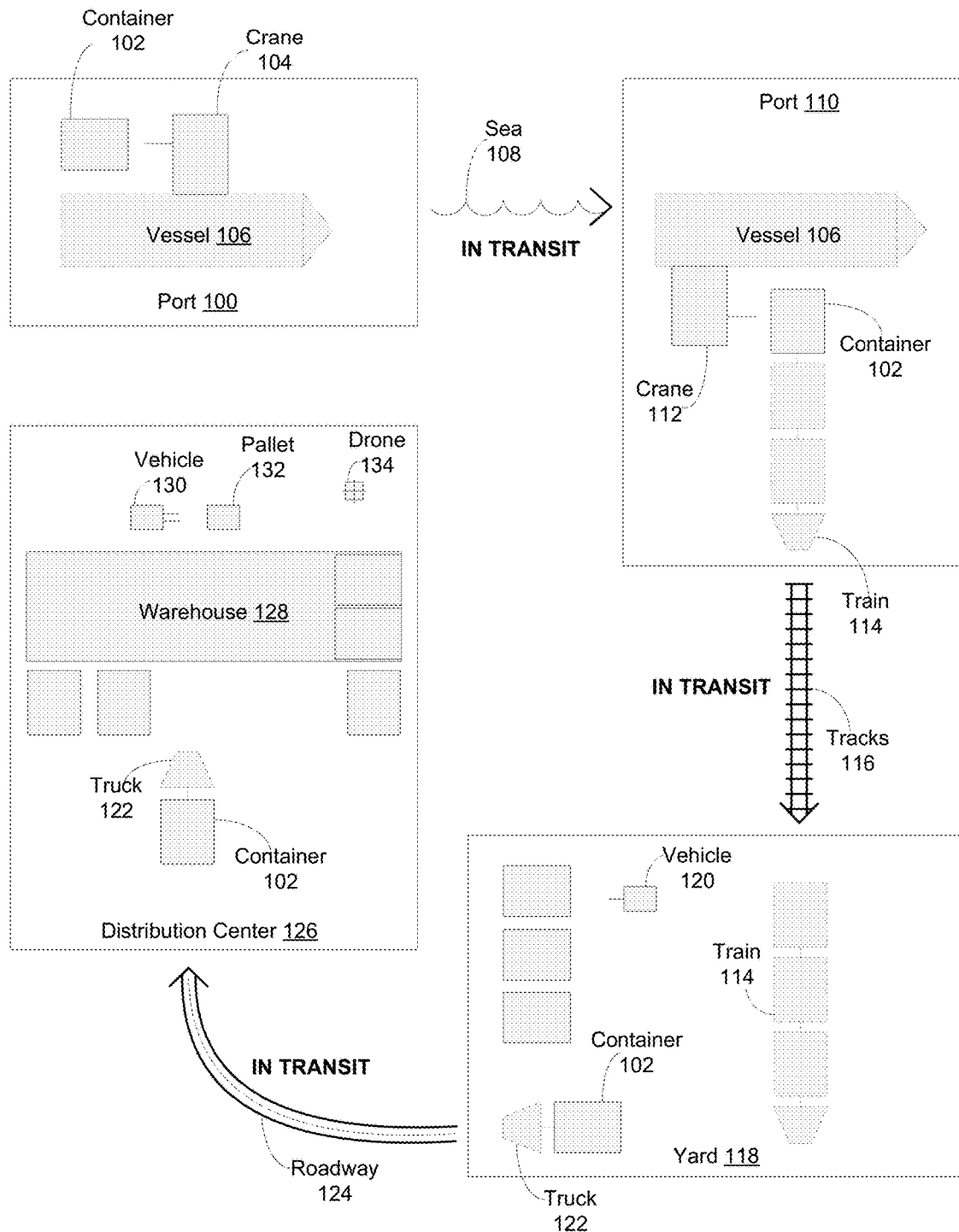
FIG. 1 is a schematic diagram of an example supply and distribution chain.

FIG. 1 is a schematic diagram of an example supply and distribution chain. Products and goods may be produced at a manufacturing plant and transported to a first port 110. The first port 110 may comprise a shipping container 102 that is loaded by a first crane 104 onto a vessel 106. The first crane 104 may be an autonomous crane or robot, and/or a human operated crane or robot. The vessel 106 may be any type of vehicle used to convey the container 102 oversea, such as, e.g., a marine ship or an airplane. The vessel 106 mat then transit an ocean or sea 108, and arrives at a second port 110.

A second crane 112 may unload the shipping container 102 from the vessel 106, and then load the container 102 onto a train 114 comprising several cars. The train 114 may transit tracks 116 and arrive at a yard 118, where the shipping container 102 is offloaded and stored in a line with other shipping containers. The shipping container 102 may be outfitted with wheels to allow it to be towed. Trailers that are not shipping containers may also be present at the yard 118. A first site vehicle 120, such as, e.g., a crane or a mule, may move and arrange the various shipping containers as desired. Finally, the shipping container 102 may be hitched to a truck 122. The truck 122 may transit a roadway 124 and arrive at a distribution center 126. In some embodiments, the shipping container 102 may skip the distribution center 126 and is delivered directly to a consumer or another facility. The distribution center 126 may comprise a warehouse 128, and serve as a terminus comprising various shipping containers. Different warehouses may comprise specialized capabilities, such as, e.g., temperature control or additional security. A second site vehicle 130, such as, e.g., a forklift, may be employed to unload the shipping containers and move small units of goods contained therein into crates or boxes or on pallet 132. In some embodiments the goods may comprise livestock. The goods may then be delivered to retail stores or customer locations via, e.g., a delivery truck or an aerial vehicle, such as a drone 134. Warehouse 128 may also comprise cross-docking, such as for transporting of the goods to other warehouses or distribution centers.

Figure 2A:
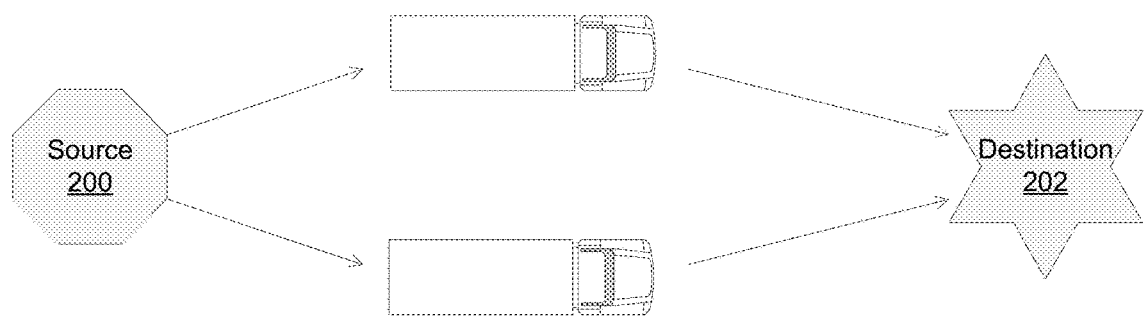
FIGS. 2A-B illustrate embodiments of various shipping methods.
Figure 2B:
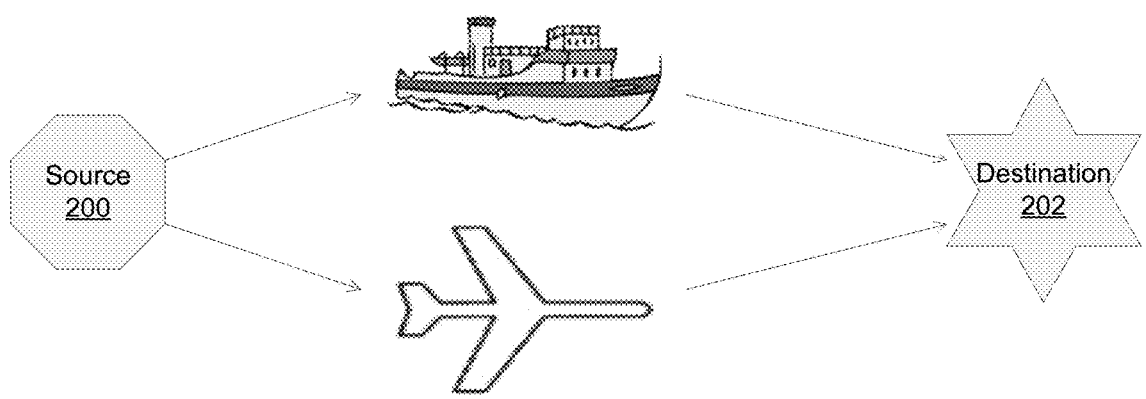

FIGS. 2A-B illustrate embodiments of various shipping methods. In FIG. 2A, two shipping methods between a source location 200 and a destination location 202 may correspond to the same mode or class of transit provided by two different carriers or the same carrier. For example, both methods may correspond to a surface-based mode of transit, such as, e.g., ground service. By contrast, FIG. 2B shows both shipping methods corresponding to different modes of transit, also either by two different carriers or the same carrier.

Multiple possible combinations of carriers and classes or modes of transit may exist between source 200 and destination 202. For example, common carriers may include DHL, the United States Postal Service (USPS), FedEx, and other shipping companies as well as the postal services of other countries. Additionally, privately contracted carriers, such as, e.g., company-owned fleets, or private drivers of an auction-based or on-demand economy platform or exchange, may be employed to implement the transit as an alternative or complement to the use of common carriers. In some embodiments, for example, where source 200 and destination 202 are located within a single facility, the shipping methods may include various small-scale procedures and resources for moving materials, such as, e.g., forklifts, mules, manned push carts, trucks, and conveyor systems. Generally, a shipping or transportation method may encompass any suitable method for conveying tangible goods from one location to another on a large or small geographic scale, including common and/or private carriers, and land, air, and/or sea modes.

In some embodiments, each shipping method may be independently modeled to yield predictions regarding transit times from source 200 to destination 202 to ideally represent the actual behavior of the shipping or transportation mode.

A predictive model of a shipping method may be constructed through analysis of empirical transit data of actual shipments from source 200 to destination 202 using collected tracking data documenting the progress of items in transit. In addition, the predictive model may be built based on simulated or anticipated demand, such as, e.g., a new business unit with no historical actual shipment data available. Common carriers typically make such tracking data available to shippers and customers via web-service interfaces. Tracking data may, for example, indicate the date and time at which an item was accepted by the carrier for shipment from source 200 and the date and time of delivery at destination 202. During intra-facility materials handling, empirical transit data may be collected via, e.g., bar code or RFID scanning devices, and may operate in conjunction with a locator system, such as, e.g., a GPS, an inertial navigation system (INS), a beacon, or an LED location scanning system. Over time, empirical tracking data may yield a substantial number of data points regarding shipments from source 200 to destination 202 using a particular shipping method. Tracking data and other shipping or conveyance data may be representative of a number of different transit characteristics of conveyance of goods from source 200 to destination 202. A transit characteristic may comprise any measurable or empirically observable aspect of a route between source 200 and destination 202. For example, transit characteristics may comprise transit latency and/or probability distribution of a measured metric, such as, e.g., shipping rates and/or a distribution of such rates corresponding to an item's dimensions and weight. A transit characteristic may be grouped together according to a similarity criterion, such as, e.g., a transit latency value, such that the grouping occurs when the similarity criterion matches exactly or within a given threshold of difference, e.g., an absolute number of units, a percentage, or a range. Through analyzing the data, the system and the method may be able to detect anomalies in the movement and handling of an asset in the transit operation by comparing a collected data point to the predictive model.

Figure 3:
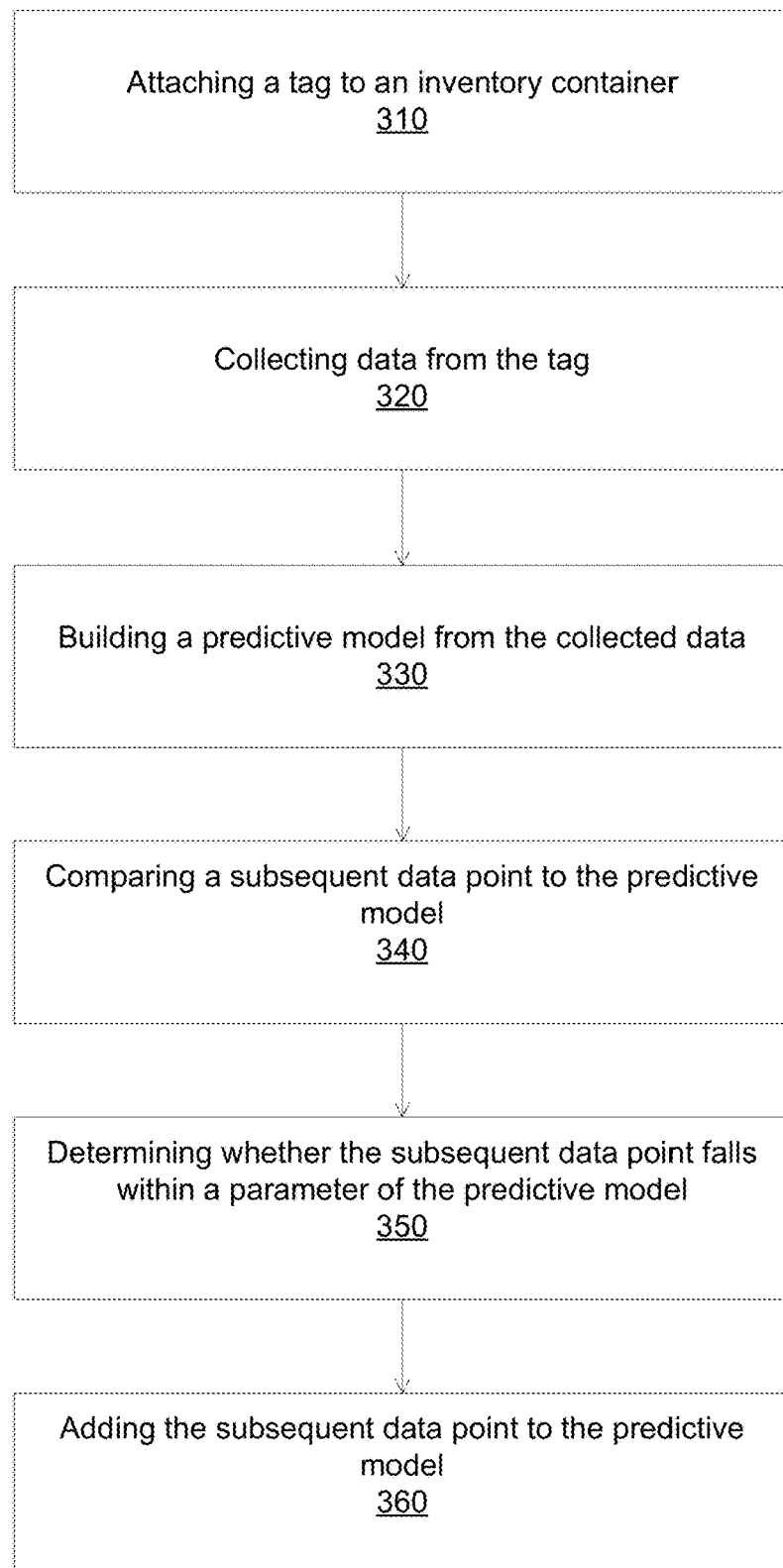
FIG. 3 is a flowchart of a method for detecting anomalies in the movement of an asset, according to at least one embodiment.

FIG. 3 is a flowchart of a method for detecting anomalies in the movement of an asset, according to at least one embodiment. Operation 310 may attach a tag to an asset to be tracked in a transit operation. The tag may provide identification and location data of the asset in addition to various sensory data for monitoring the asset or the inventory being transported by the asset. Operation 320 collects data from the tag attached to the asset as it moves from one location to another and recording the time of the reading. The data may be sent to a central server for processing. Operation 330 builds a predictive model from the collected data. For example, the data may be classified into classes with common properties. Operation 340 compares a subsequently collected data point to the predictive model. Operation 350 determines whether the subsequently collected data point falls within a parameter of the predictive model, such as, e.g., within a geographic radius. For example, if the subsequently collected data point falls within the parameter, the data point may be considered normal; on the other hand, if the data point falls outside of the parameter, the data point may be considered abnormal and may require further analyses or processing. Operation 360 may add the subsequently collected data point to the predictive model and thereby generating a new predictive model.

Figure 4:
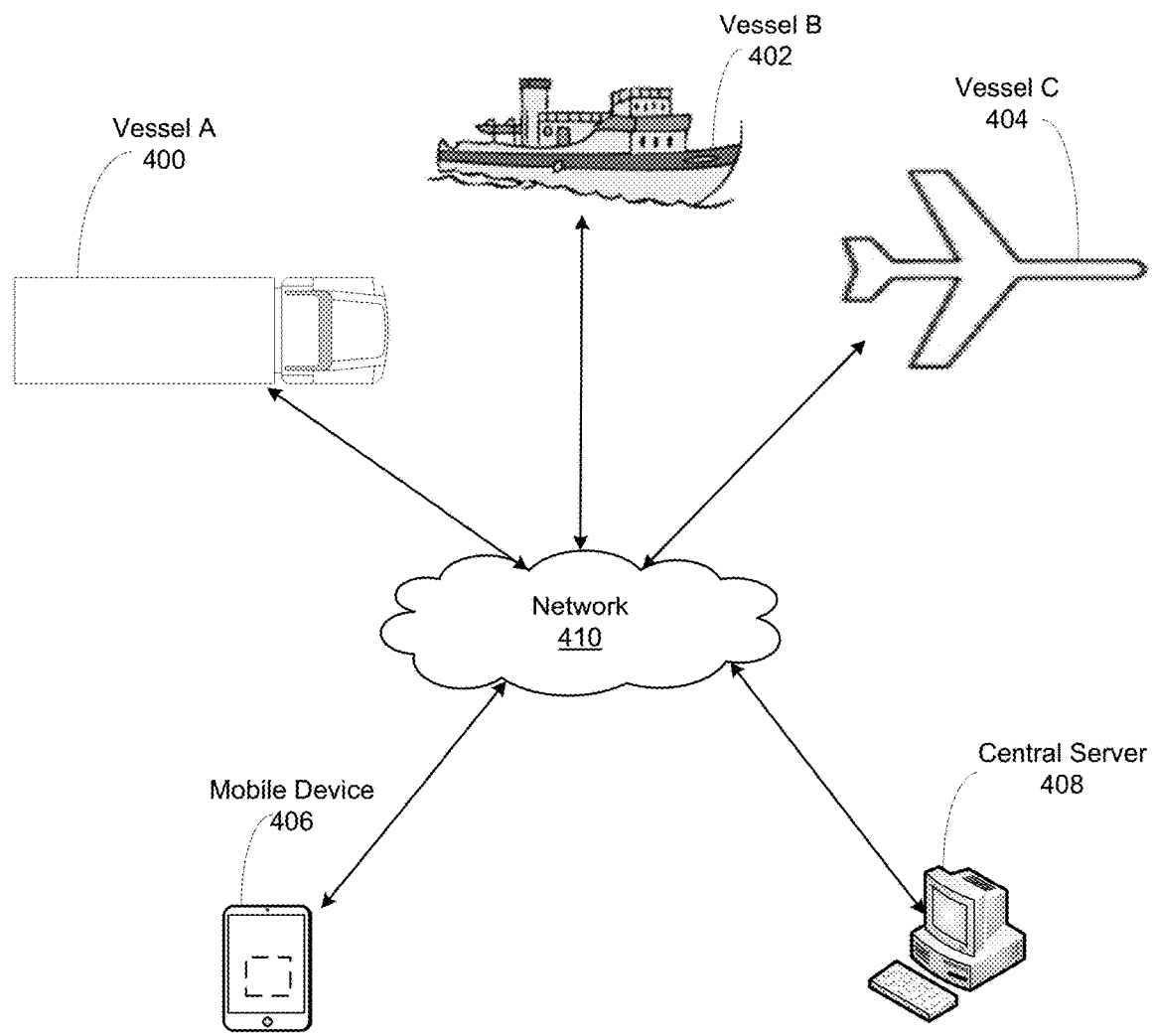
FIG. 4 illustrates a fleet management system, according to at least one embodiment.

FIG. 4 illustrates a fleet management system, according to at least one embodiment. As a plurality of vehicles or assets proceeds through its assigned routes, they may be equipped with one or more sensors, such as, e.g., a telematics device or a location transmitting devices. The location transmitting devices may be able to send location information to a central server as each vehicle progresses and the estimated times of arrival at a destination may be continually updated. Vessel A 400, vessel B 402, and vessel C 404 may be communicatively coupled to a mobile device 406 and a central server 408 via a communications network 410, such as, e.g., the Internet, an Intranet, a hybrid-cloud network, or other suitable network. In addition, vessel A 400, vessel B 402, vessel C 404, mobile device 406, and central server 408 may be configured for storing data to an accessible database of, or alternatively, stored remotely from, the central server 408. The sensors may generate telematics data associated with, e.g., engine ignition, engine speed, vehicle speed, vehicle location, status of vehicle seat belts engagement, doors, handles, distance traveled, throttle position, brake pedal position, parking brake position, onboard sensory data, e.g., temperature, cargo hold utilization, onboard weight, self-diagnostic, and/or data associated with the environment in which the vehicle is operating, such as, e.g., a sensor for detecting temperature, moisture, pressure, or weather events. According to various embodiments, an on/off sensor, which may register a voltage amount that corresponds with an on or off condition, may be disposed within an asset for collecting data. For example, a seat belt sensor may register 0V when the seat belt is disengaged and 12V when the seat belt is engaged. This may be sufficient for the seat belt sensor in particular because the seat belt is either engaged or disengaged at all times. In other embodiments, a variable voltage sensor, which may register variations in voltage, may also be disposed within the asset for collecting data. For example, the engine speed sensor may detect the speed of the engine in revolutions per minute (RPM) by registering a particular voltage that corresponds to a particular RPM reading. The voltage of the sensor may increase or decrease proportionately with increases or decreases in the engine RPM.

The analysis of data collected by the sensors may be performed by software or an algorithm executed by a processor coupled with a memory, such as from the central server 408. The central server 408 may be configured to analyze and identify received data indicating various inefficiencies, safety hazards, or security hazards present in the transit operation protocol. In some embodiments, the sensors may transmit telematics data via network 410 to the mobile device 406 operated by a driver associated with vessel A 400, vessel B 402, and/or vessel C 404.

Figure 5:
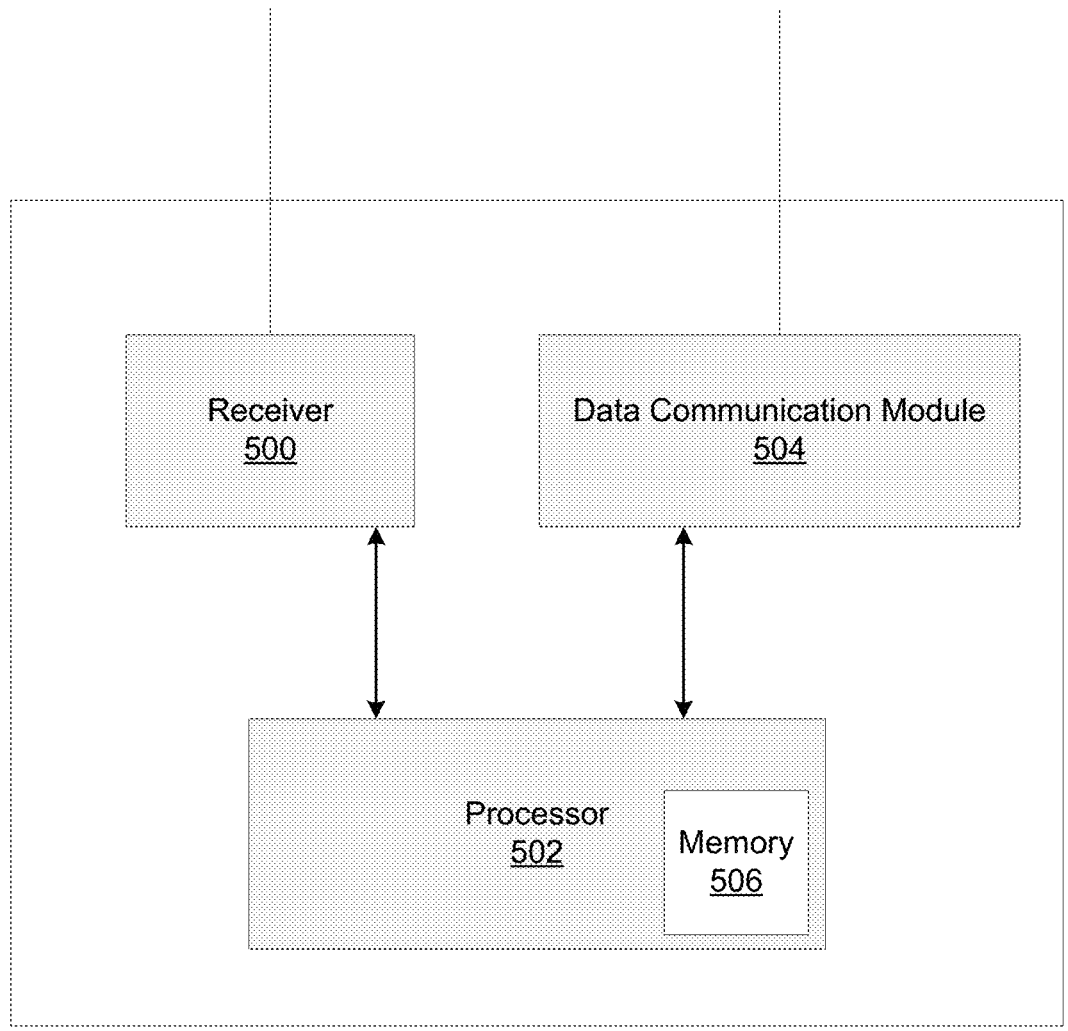
FIG. 5 is a schematic diagram of a location transmitting device, according to at least one embodiment.

FIG. 5 is a schematic diagram of a telematics device attached to, or embedded with, a supply chain asset, according to at least one embodiment. The telematics device may comprise a receiver 500, a processor 502, a communication module 504, and a memory 506. The receiver 500 is operable to determine location information of a vehicle or mobile device using satellite network data. Typically, this data comprises coordinates, speed, and direction of the telematics device. The processor 502 may receive location information from the receiver 500 and transmit to a central server using the data communication module 504 at predetermined time intervals. The communication module 504 is preferably a cellular transmitter operable to send data from the telematics device over a cellular network, or alternatively, over a satellite network or wireless network connection. The data communication module 504 may comprise a receiver to receive information and data from the central server. The telematics device may be configured to control a variety of vehicle sensors, such as, e.g., capture and store vehicle telematics data generated by the sensors for analyzing. In some situations, the telematics data may be unable to be immediately transmitted, such as, e.g., due to unavailability of Internet connectivity. In such cases, the system may temporarily store, such as, e.g., accumulate or queue, data to its local computer storage and retransmit data as soon as stable Internet connectivity is re-established. The accumulated data may then get removed from memory 506 after successful transmission to the central system server.

Figure 6:
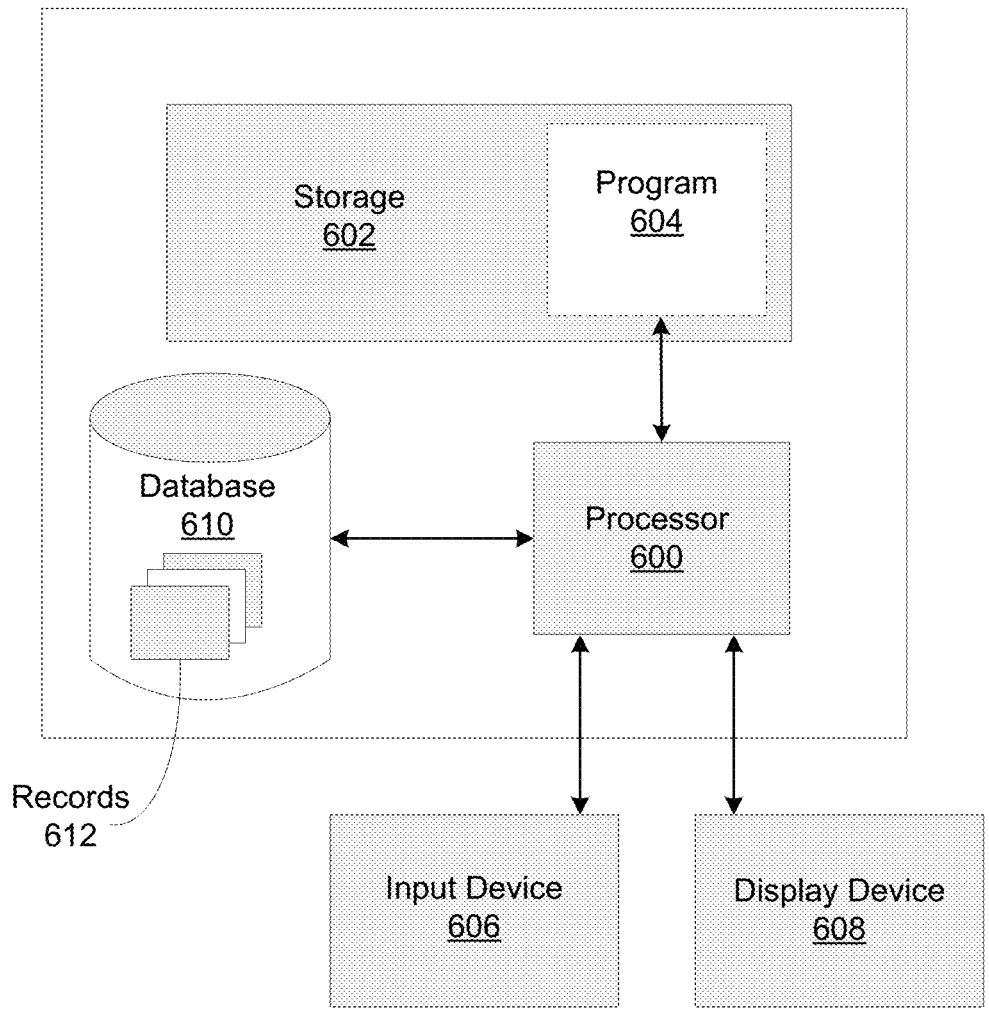
FIG. 6 is a schematic illustration of a central server, according to at least one embodiment.

FIG. 6 is a schematic illustration of a central server, according to at least one embodiment. The central server may be a conventional computer operable to execute coded instructions comprising a processor 600, a memory storage device 602, a program 604, an input device 606, and a display device 608. The processor 600 may be any processing unit that is typically known in the art with the capacity to run computer program 604, and may be communicatively coupled to memory storage 602, such as, e.g., a local hard-disk. Input device 606 may be any device suitable for inputting data into the central server, such as, e.g., a keyboard and a mouse, and may be communicatively coupled to processor 600. Display device 608 may be any suitable device communicatively coupled to processor 600 operable for displaying data to a user or administrator of the system. Program 604 may be stored in memory storage 502, and may be operable to provide instructions to processor 600. Database 610 may be communicatively coupled to the central server and operable to store data. Typically, database 610 comprises a number of records 612 corresponding with transit operations, such as, e.g., a delivery job, an initial pick-up location, a driver identifier, a vehicle position, and a time stamp.

In some embodiments, in addition to receiving telematics data from vehicle sensors, a mobile device may be configured to collect and transmit telematics data on its own. For example, the mobile device may include a location determining device, such as a GPS, for providing location information of the driver, as opposed to location information associated with the vehicle or vessel.

Figure 7:
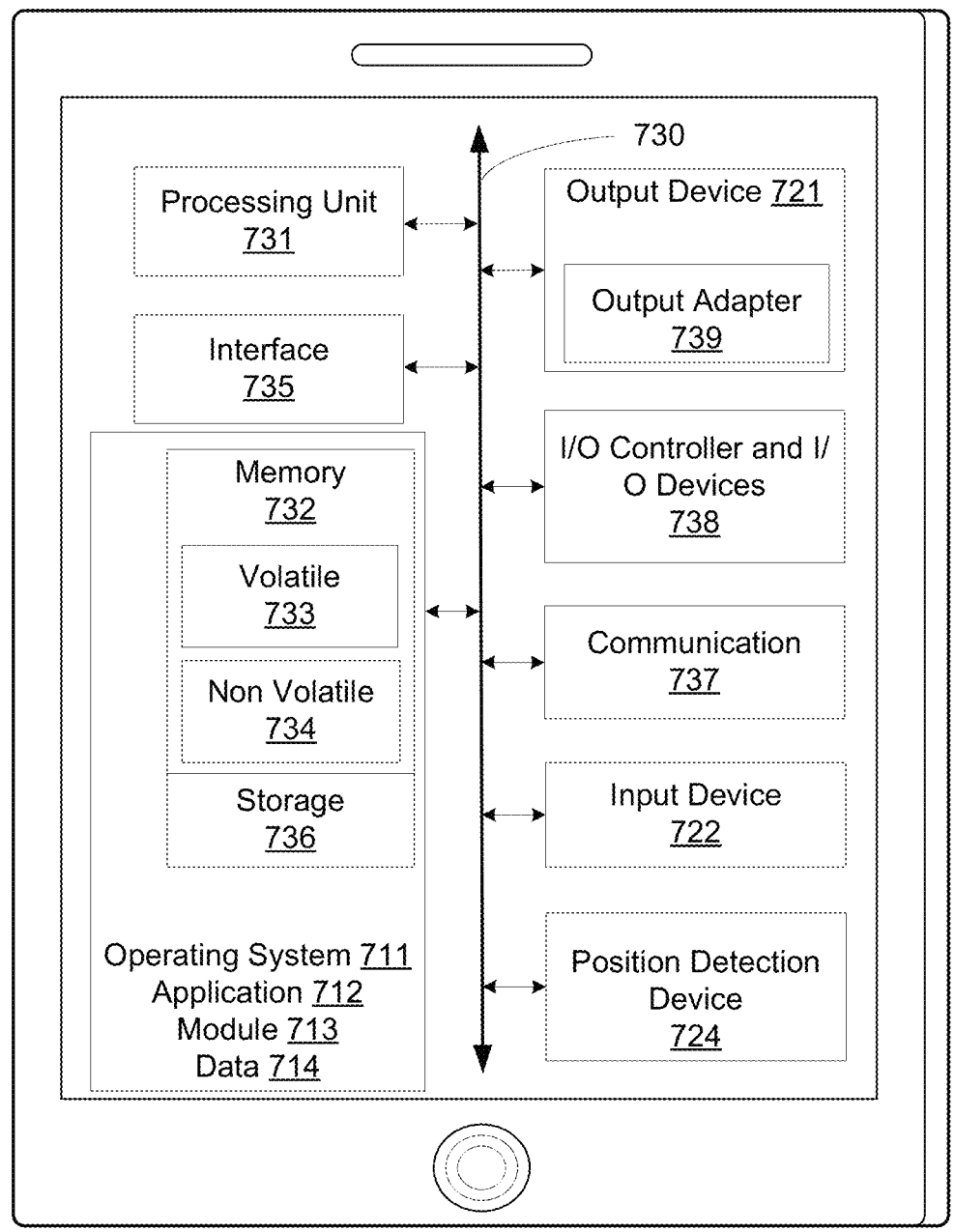
FIG. 7 illustrates a computing environment of a mobile device for implementing various aspects of the invention.

FIG. 7 illustrates a computing environment of a mobile device for implementing various aspects of the invention. The processing unit 731 may be any of various available processors, such as single microprocessor, dual microprocessors or other multiprocessor architectures. The system bus 730 may be any type of bus structures or architectures, such as 12-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), or Small Computer Systems Interface (SCST).

The system memory 732 may include volatile memory 733 and nonvolatile memory 734. Nonvolatile memory 734 may include read only memory (ROM), programmable ROM (PROM), electrically programmable ROM (EPROM), electrically erasable ROM (EEPROM), or flash memory. Volatile memory 733, may include random access memory (RAM), synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), or direct Rambus RAM (DRRAM).

The mobile device also includes storage media 736, such as removable/non-removable, volatile/nonvolatile disk storage, magnetic disk drive, floppy disk drive, tape drive, Jaz drive, Zip drive, LS-100 drive, flash memory card, memory stick, optical disk drive such as a compact disk ROM device (CD-ROM), CD recordable drive (CD-R Drive), CD rewritable drive (CD-RW Drive) or a digital versatile disk ROM drive (DVD-ROM). A removable or non-removable interface 735 may be used to facilitate connection.

The mobile device may further include software to operate in the computing environment, such as an operating system 711, system applications 712, program modules 713 and program data 714, which are stored either in system memory 732 or on disk storage 736. Various operating systems or combinations of operating systems may be used.

Input device 722 may be used to enter commands or data, and may include a pointing device such as a mouse, trackball, stylus, touch pad, keyboard, microphone, joystick, game pad, satellite dish, scanner, TV tuner card, sound card, digital camera, digital video camera, web camera, and the like, connected through interface ports 738. Interface ports 738 may include a serial port, a parallel port, a game port, a universal serial bus (USB), and a 1394 bus. The interface ports 738 may also accommodate output devices 721. For example, a USB port may be used to provide input to the mobile device and to output information from the mobile device to an output device 721. Output adapter 739, such as video or sound cards, is provided to connect to some output devices such as monitors, speakers, and printers.

The position detection device 724 may be a device that communicates with a plurality of positioning satellites, e.g., GPS satellites, to determine the geographical location of the mobile device, and thus the user. To determine the location of the user, the position detection device 724 searches for and collects GPS information or signals from four or more GPS satellites that are in view of the position detection device 724. Using the determined time interval between the broadcast time and reception time of each signal, the position detection device 724 may calculate the distance of the user relative to each of the four or more GPS satellites. These distance measurements, along with the position and time information received in the signals, allow the position detection device 724 to calculate the geographical location of the user.

The mobile device may be communicatively coupled to remote computers, such as, e.g., the platform, through the network. The remote computers may comprise a memory storage device, and may be a personal computer, a server, a router, a network PC, a workstation, a microprocessor based appliance, a peer device or other common network node and the like, and typically includes many or all of the elements described relative to computer 601. Remote computers may be connected to the mobile device through a network interface and communication connection 737, with wire or wireless connections. A network interface may be communication networks such as local-area networks (LAN), wide area networks (WAN) or wireless connection networks, or by cellular network communication technology. LAN technologies include Fiber Distributed Data Interface (FDDI), Copper Distributed Data Interface (CDDI), Ethernet/IEEE 1202.3, Token Ring/IEEE 1202.5 and the like. WAN technologies include, but are not limited to, point-to-point links, circuit switching networks like Integrated Services Digital Networks (ISDN) and variations thereon, packet switching networks, and Digital Subscriber Lines (DSL).

In some embodiments, the present invention discloses a system and a method for a connected and autonomous supply and distribution chain, which can analyze and incorporate business intelligence data into an optimization algorithm and may compute feasibility, balance resources based on user-defined settings or machine-learning processes, and/or minimize operating costs of a logistic operation. For example, a determination of the additional amounts of risk and cost may be assessed for assigning additional assets to a job, such as, e.g., additional forklifts to move cargo within a warehouse, and may be weighed with the benefit of time reduction in completing the task. In general, business intelligence may refer to theories, methodologies, architectures, and/or technologies that transform raw data into meaningful and useful information for business purposes and may include, for example, multidimensional aggregation and allocation; denormalization, tagging and standardization; real-time reporting with analytical alerts; interfacing with unstructured data sources; statistical inference and probabilistic simulation operations; key performance indicator optimization; version control and process management; and open item management. Thus, business intelligence data may be utilized to provide historical, current, and/or futuristic or predictive views of the operation of a fleet, and may include, e.g., reporting, online analytical processing, analytics, data mining, process mining, complex event processing, business performance management, benchmarking, text mining, predictive analytics, and prescriptive analytics. Business intelligence tools reflective of the aforementioned business intelligence technologies may refer to a type of application software designed to retrieve, analyze and report data for achieving such business intelligence. Examples of business intelligence tools may include, but are not limited to, populating spreadsheets, reporting and querying software, online analytical processing, digital dashboards, business performance management, and decision engineering.

Typically, a delivery fleet will begin with a number of delivery jobs to perform with a set number of assets in the fleet. Each delivery job will usually comprise a pickup location, where a load or cargo has to be loaded onto the vehicle, and a delivery location, where a load or cargo has to be delivered to, and unloaded from, the asset. For example, when a driver starts to travel to a destination, a vehicle trip begins. When the driver reaches the destination and delivers the package, the vehicle trip ends. Thus, a full delivery route will often comprise a number of vehicle trips or delivery jobs. Telematics data may be captured by a fleet management system from the vehicles in the fleet as they execute various delivery routes.

The platform may provide for the scheduling of transits, e.g., conveyance and customer delivery, using estimated arrival times that are continually updated with real world data while the transit progresses. Location information of assets may allow comparison of the actual progress of the delivery asset or vehicle to its predicted progress and update the estimated times of arrival. As such, inaccuracies in initial estimates and unforeseen circumstances are taken into account by the system and the method, and the scheduling of subsequent delivery jobs may use these timely estimates to increase the accuracy of the overall scheduling. For example, the loading of the delivery asset or vehicle at a loading destination may have taken more or less time than originally estimated, or the asset for reasons such as traffic or delay could take longer to travel to and from the destination. Alternatively, the driver of the asset could have stopped, went down a different route, drove faster than the estimated speed, or simply got lost. Periodically retrieving location information of the asset may nullify and account the unexpected events to provide for more accurate calculations and updates of estimated times of arrival at subsequent destinations.

Figure 8:
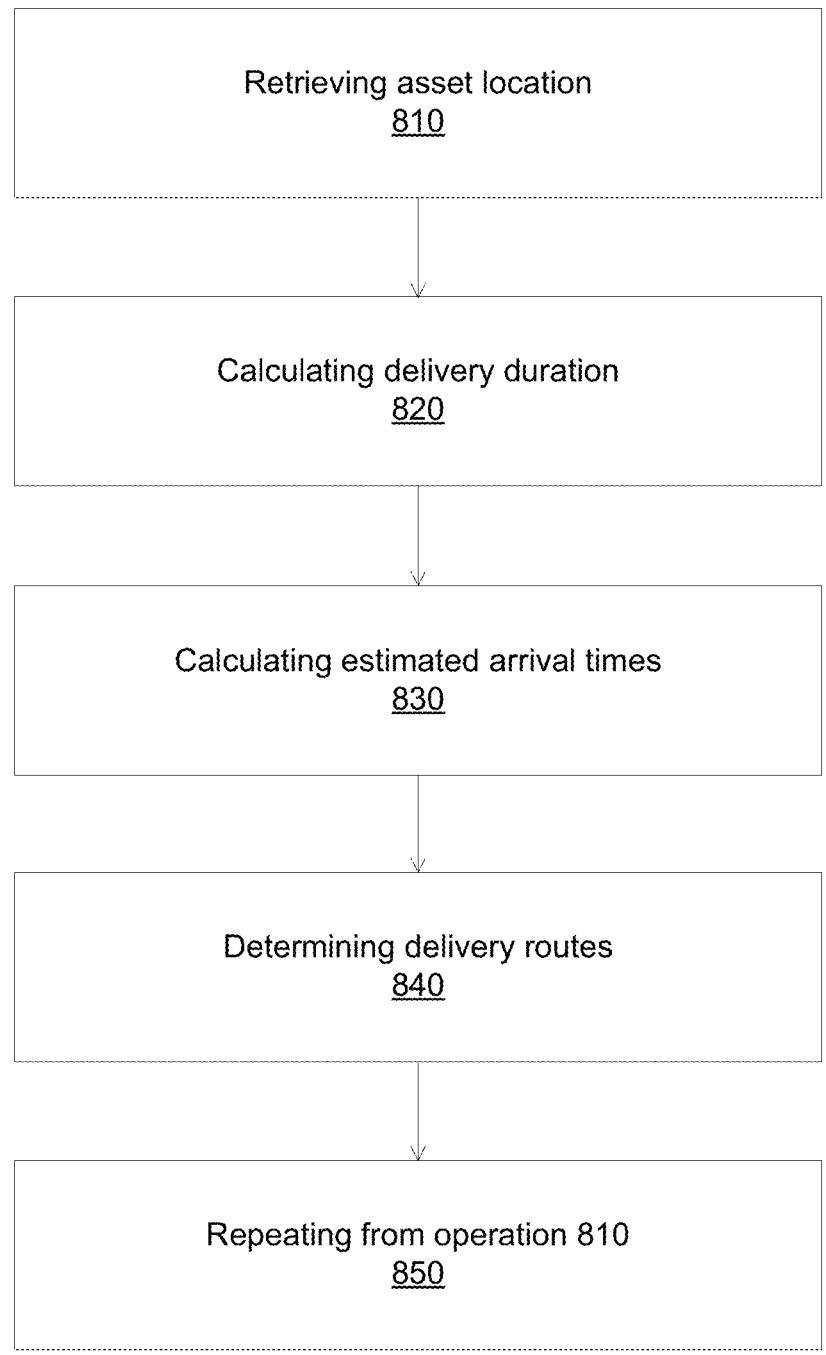
FIG. 8 is a flowchart of a method for a supply and distribution chain, according to at least one embodiment.

FIG. 8 is a flowchart of a method for a supply and distribution chain, according to at least one embodiment.

The method may be repeated indefinitely until all delivery jobs of an operation are complete. Operation 810 receives telematics data such as coordinates of an operation's asset, e.g., trucks, trains, ships, airplanes, micro-drones, delivery drones, humanoid robots, self-driving or self-guided car robot drones. Location information may comprise an asset identifier, coordinates, direction, and speed. Operation 820 calculates delivery duration for each destination or delivery job. A job that is in progress may comprise an estimated remaining time to completion, and a job that has not begun may comprise an estimated total time required to complete. Delivery duration may typically be the time to unload or deliver an inventory at a destination, and/or load the asset for transporting to a next destination. Operation 830 calculates estimated arrival times to all pending destinations. For example, a delivery job that is currently in progress will comprise an estimated arrival time of zero. Operation 840 determines delivery routes for all assets to fulfill all remaining destinations. Assets may be assigned destinations or delivery jobs based on estimated delivery duration from operation 820 such that multiple assets arrive at the destination or delivery job when the previous asset's delivery duration reaches zero. Typically, there will be more destinations or delivery jobs than assets such that when an asset finishes with a destination or job, it may be dispatched to another destination or job. When an asset has completed a delivery job, it may be assigned another delivery job based on the information known about all of the other remaining unassigned or assigned delivery jobs being completed by the other assets, such as, e.g., delivery duration, remaining route, completed route, asset compatibility, operational constraints, environment constraints, geographic constraints and inventory compatibility. Operation 850 repeats operations 810 to 850.

In at least one embodiment, the present invention discloses a system and a method for autonomous detection of asset compatibility based on a target transit operation, and to optimize a route based on the compatibility data. Unlike a regular supply and distribution chain, in which human beings decide vehicle or asset compatibility types, e.g., drivers, roads, buildings, marine ships, and load docks, the autonomous supply and distribution chain of the present invention may maintain a centralized asset compatibility database within the platform, as well as detailed information about each asset and how it can function interactively with the other assets in the supply and distribution chain. For example, the autonomous supply and distribution chain may mix asset classes, such as a human driven vehicle that delivers or picks up from a fully autonomous warehouse, or vice versa, such as a fully autonomous vehicle that delivers or picks up from a human operated warehouse. In the event that various assets are misclassified or are determined to be incompatible during the execution phase in the supply and distribution chain, the system and the method may compensate using various methods and access sensors present on each machine in the chain, such as, e.g., machine vision, fuzzy logic, risk analysis and scoring, as a fallback to try to complete the necessary step. An optimization algorithm may compute and determine the combination or mixture such that the logistics operation is maximized, and may involve dynamically updating and changing the combination or mixture as new data are received and analyzed while the transit operation is in progress. Asset compatibility specifications may be defined by the manufacturer of the asset, and may be overridden by the administrator. The autonomous platform may use artificial intelligence to reconfigure itself and re-coordinate all the assets in its control to fully maximize the efficiency of the supply and distribution chain, including running its own multivariate experiments unknown to human operators, making modifications to these experiments over time based on quantitative, qualitative, and other types of logic. The system and the method may use artificial intelligence to predict which autonomous supply and distribution chain assets are likely to underperform based on available data, such as, e.g., telematics data, sensor data, onboard diagnostics data, recent exposure to hazardous road conditions, and a series of inclement weather events.

The asset compatibility calculations and determinations may be based on operation unit data including, but not limited to, e.g., driver data, road data, building data, vehicle data, and environmental data. Driver data may identify various driver profiles that may correspond to known or recorded driving behavior of the driver, e.g., aggressive or passive. Road data may identify the different road networks in a driving route, e.g., highway, freeway, slow zone, parking structure, overpass and underpass. The road data may also comprise data corresponding to quality of road, such as if a specified road is rough or smooth. Building data may identify the structure involved, e.g., high-rise building, warehouse, or residential structure. Vehicle data may identify a means of travel, e.g., aerial, terrestrial, or marine, and whether the vehicle is autonomous, e.g., self-driving or human operated. Vehicle data may also include maintenance data, such as, e.g., maintenance requirements and schedules, for each vehicle. Environmental data may identify the asset or vehicle's carbon footprint, e.g., carbon monoxide emissions.

The system and the method may map and analyze existing relationships between the operation units of a fleet and the one or more assets or elements associated with each of the units, and may provide transit route recommendations based on compatibility of the assets or elements. A supply and distribution chain management server may comprise one or more relational databases that organize operation units utilized in a transit operation protocol. Moreover, a computing device hosting an ecosystem application may be configured to access the relational database, and based on the associations, determines compatible assets or elements to carry out the functions of each step of the transit operation, e.g., determines the type of vehicle suitable to engage and displace a cargo of a particular size and weight to a particular distance and elevation. As a result, autonomous and intelligent recommendations can be provided to a transit operation regarding the use and/or implementation of technology assets or elements in order to facilitate a uniform operational ecosystem. Such uniformity may be achieved by incorporating the least amount of different asset or element functions possible in order to improve efficiency and reduce the instances of, e.g., redundant data and protocol translations or conversions due to incompatibilities. Uniformity can also be achieved by implementing assets with a preferred data, software, and/or hardware compatibility, e.g., requiring the least amount of extraneous resources to achieve compatibility.

Besides promoting a more efficient and uniform transit operation, existing technology assets or elements can be analyzed and validated as to their usefulness to a company, allowing outdated or poor-performing technology assets to be replaced or phased out in light of more innovative, efficient, or otherwise more appropriate assets. Thus, early detection of issues in the supply and distribution chain can prevent or head off unwanted vendor or technology entrenchment. Any changes to the chain can be planned and implemented more quickly and efficiently, allowing a company to adapt to changing industry conditions, and avoid unwanted discontinuities in its operations.

Figure 9:
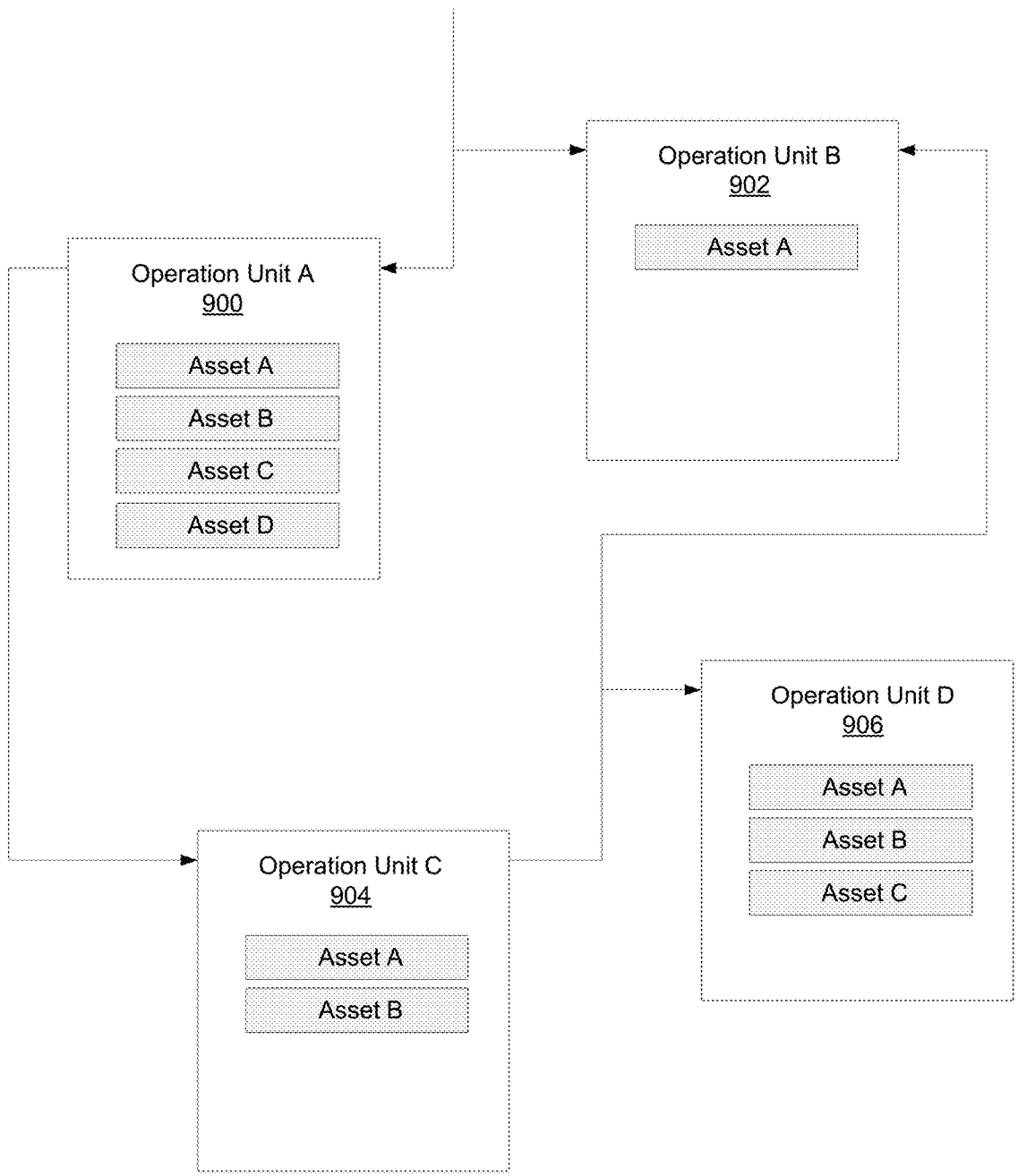
FIG. 9 illustrates an example relational map of a company's operation units, according to at least one embodiment.

FIG. 9 illustrates an example map of a company's operation units, according to at least one embodiment. This map can be utilized as a back-end support upon which queries and/or recommendations can be based. Administrators of a supply and demand chain may be presented with a visual representation of such a map to provide a view of a company's assets or elements and their interrelationships. The map may comprise operation unit A 900, operation unit B 902, operation unit C 904, and operation unit D 906 corresponding to, e.g., driver data, road data, building data, vehicle data, and environmental data. Each operation unit may be associated with one or more assets or elements. For example, driver data may identify various driver profiles that may correspond to known or recorded driving behavior of the driver, e.g., aggressive or passive. Road data may identify the different road networks in a driving route, e.g., highway, freeway, slow zone, parking structure, overpass and underpass. The road data may also comprise of data corresponding to quality of road, such as if a specified road is, e.g., rough or smooth. Building data may identify the structure involved, e.g., high-rise building, warehouse, or residential structure. Vehicle data may identify a means of travel, e.g., aerial, terrestrial, or marine, and whether the vehicle is autonomous, e.g., self-driving or human operated. Environmental data may identify the asset or vehicle's carbon footprint, e.g., carbon monoxide emissions.

The map may illustrate the various relationships between operation unit A 900, operation unit B 902, operation unit C 904, and operation unit D 906 indicated by the arrows in the figure. In some embodiments, an administrator may interact with the map via a graphical user interface (GUI) by selecting the displayed operation units to obtain more detailed information, such as relationships between the assets or elements themselves, vendor information and/or evaluative information.

Additionally, there are other factors that may come into play, for example, capacity and flow rate at a specific facility might be too slow, so part of the truck that is being automatically partially unloaded, may end up late to the second destination at the day. The system and the method of the present invention may take into consideration these different factors to optimize the logistic operation, such as by assigning the appropriate asset, e.g., driver or vehicle, to carry out the functions, and may dynamically and continually update the operation as it progresses. In addition to asset or element compatibility determinations based on their operational constraints, consideration may be given to financial constraints, environment constraints and/or geographic constraints to compute the optimized operational procedure.

A financial constraint can be any monetary or cost limitation to an aspect of the operations of a supply and distribution chain, such as, e.g., operating costs, asset maintenance costs, and legal expenses. In general, an operational constraint may be any element, factor, and/or subsystem that limits or restricts an aspect or activity of the operation based on functionality of the assets. Operational constraints may be fixed values, but can slightly alter with time due to asset degradation, e.g., max distance may decrease over time due to engine and transmission wear and tear. For example, warehouse loading docks may comprise of structurally differing heights, and because the incline or elevation of the approach to the loading dock is variable, autonomous vehicles or assets may require this data ahead of time to determine whether service to a particular location is possible. As another example, a driver-related operational constraint may due to their authorization to operate certain types of vehicles that correspond to their driver profile or driving behavior, e.g., large truck or small cargo van. Operational constraints corresponding to road type may include, e.g., weight and height limitations. Building type operational constraints may indicate limiting or restricting features of the building, e.g., loading dock height, weight capacity, and cargo capacity. Operational constraints related to vehicle types may include, e.g., capacity, distance, maintenance schedule and driving schedule requirements. Operational constraints related to environment type may involve the use of green transportations, e.g., electric cars and hybrid vehicles, to reduce greenhouse gases emission and to reduce fuel consumption, and to be environmentally sustainable.

Figure 10:
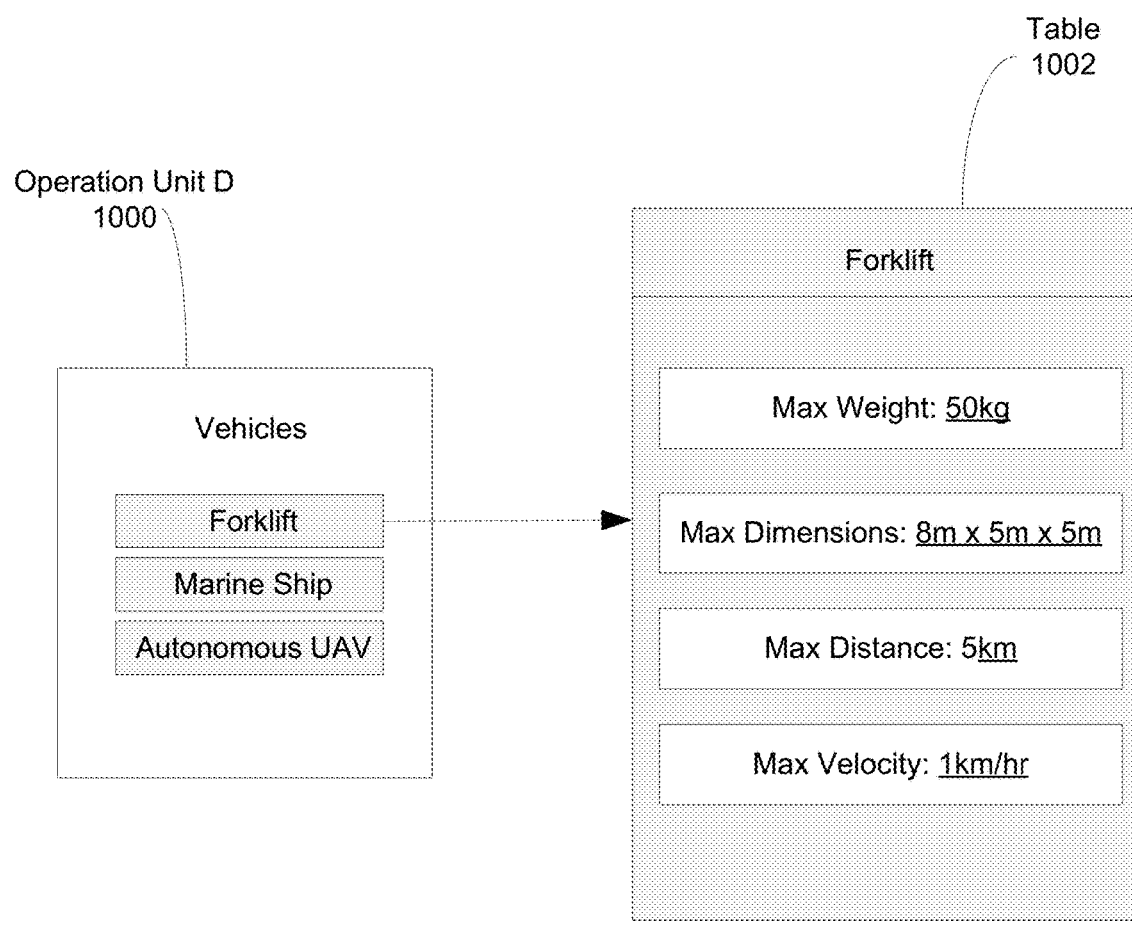
FIG. 10 illustrates a table of operational constraints corresponding to an operation unit, according to at least one embodiment.

FIG. 10 illustrates a table of operational constraints corresponding to an operation unit, according to at least one embodiment. Operation unit D 1000 may correspond to vehicle types, and may comprise assets, e.g., light or heavy capacity forklift, marine ship and manned or unmanned aerial vehicles (UAV), belonging to a company or fleet. The system and the method of the present invention may allow an administrator to interact with a GUI to pull up additional data about an operation unit and/or its assets or elements, such as to view table 1002. Table 1002 may list all known operational constraints belonging to a particular asset or element, such as for a forklift in the example shown, e.g., maximum weight, maximum dimension, maximum distance, and maximum velocity. The operational constraints may be factored into the optimization of a transit operation when determining asset compatibilities to carry out the functions of the operation in order to avoid inefficiencies and inoperability. Aside from operational constraints, table 1002 may include, e.g., an identification of an assigned operator; a warehouse identification comprising a numeric or alphanumeric ID or code for specifying a particular warehouse in which an asset is located; an asset name or code to indicate, for example, whether the resource is equipment controlled by a human operator or machine; and a status indicator for indicating whether an asset is active or inactive.

In addition to financial and operational constraints, the system and the method of the present invention may consider environment constraints and geographic constraints when optimizing a transit operation. An environment constraint may be any limitation or restriction placed on the logistic operation that is beyond the limitations or restrictions of the operation's assets, such as, e.g., a weather event, or delays of cargo or inventory arriving and departing from a carrier outside of the network. In contrast to operational constraints, environment constraints may be variable, dynamic, and difficult to accurately predict. A geographic constraint may be any limitation or restriction due to landscape or geography of the transit operation or route, such as, e.g., mountains, bodies of water, and flat plains.

In some embodiments, the system and the method may assign a different weight or priority to financial constraints, operational constraints, environment constraints and geographic constraints. For example, a financial constraint such as a predetermined amount of funds dedicated to a project or transit operation may take precedence over an operational constraint whereby an asset that may not be the best choice for a transit operation may be used, such as, e.g., shipping by multiple trucks over thousands of miles over an airplane. In this case, a single airplane may have a larger capacity and be able to carry a larger load than the trucks, however, due to its higher cost-of-use the trucks may be used instead. In one embodiment, financial constraints may have the highest priority, followed by geographic constraints, environment constraints, and then operational constraints.

There are further benefits to the autonomous supply and distribution chain, such as, e.g., for vehicles operating 24 hours per day every day of the year, except during maintenance procedures and fuel refills. Since vehicles do not have biological needs such as, e.g., sleep, scheduling requirements may be different from when human drivers are involved. Scheduling requirements may be a combination of demand requirements and maintenance, and the maintenance schedule itself can be optimized to avoid peak times, e.g., accelerated maintenance ahead of Christmas, or preventative maintenance, e.g., particularly when high rates of pothole traversal are detected.

A plurality of assets, such as, e.g., trucks, trains, ships, airplanes, micro-drones, delivery drones, humanoid robots, self-driving or self-guided car robot drones, may be routed such that the vehicles are scheduled to arrive at a known bottleneck location at intentionally delayed intervals to prevent delays at the location. For example, if too many delivery machines arrive at a storage facility at the same time, there may be delays while the machines have to line up to load or unload. As each machine progresses on an assigned route, location information may be used to continually update the route to minimize latency at all junctures within the scope of the supply and distribution chain being optimized and monitored. Location information of the whereabouts of the asset may also be used to update an estimated time of arrival, such as, e.g., at a destination or at a bottleneck point, or to notify downstream human or machine assets of an expected arrival/departure time adjustment. In some embodiments, the congestion at a known bottleneck location may be mitigated by using multiple modes of transportations, such as, e.g., at a multi-modal facility. For example, if a bottleneck location is a multi-modal facility comprising a railway yard, a sea port, and an airport with limited capacities, all three transportation modes (train, cargo ship and airplane) may be used for the transit operations in the queue instead of using only one transportation mode for delivering goods, therefore alleviating congestion in loading and unloading activities in individual railway yard, sea port, and airport. When a machine completes an assigned route, or a portion of a route that the system and method may detect as meeting certain criteria, the machine may be ready to be re-routed, and the estimated durations of the remaining routes and the estimated times of completion of machines currently on assigned routes are used to assign one of the pending, queued, or newly requested routes to the vehicle or machine.

On the other hand, while having too many vehicles arriving at a specific location at a given time may cause inefficiencies, not having enough vehicles arrive at that location for a period of time can also create inefficiencies by creating downtime in the system and in the supply and distribution chain. For example, in order to prevent the downtime of operations that require a constant supply of materials or goods, the system and the method may autonomously optimize the operation to allow for storage facilities on the premises such that a surplus of necessary goods are stored and used in the operation as required. The storing of surplus may allow delivery vehicles to arrive at intermittent or constant intervals such that there is always another vehicle ready to load or unload without large gaps of time in between, such as, e.g., in excess of 30 minutes. In addition, for each portion of a transit, e.g., a delivery job, an estimate of the time required for completion is determined. Using the estimated time, an initial route is determined for each of the vehicles or machines in an operation or fleet, and is continually updated based on actual measurements to increase the accuracy of the estimated completion times and to provide a more accurate scheduling of transits.

Figure 11:
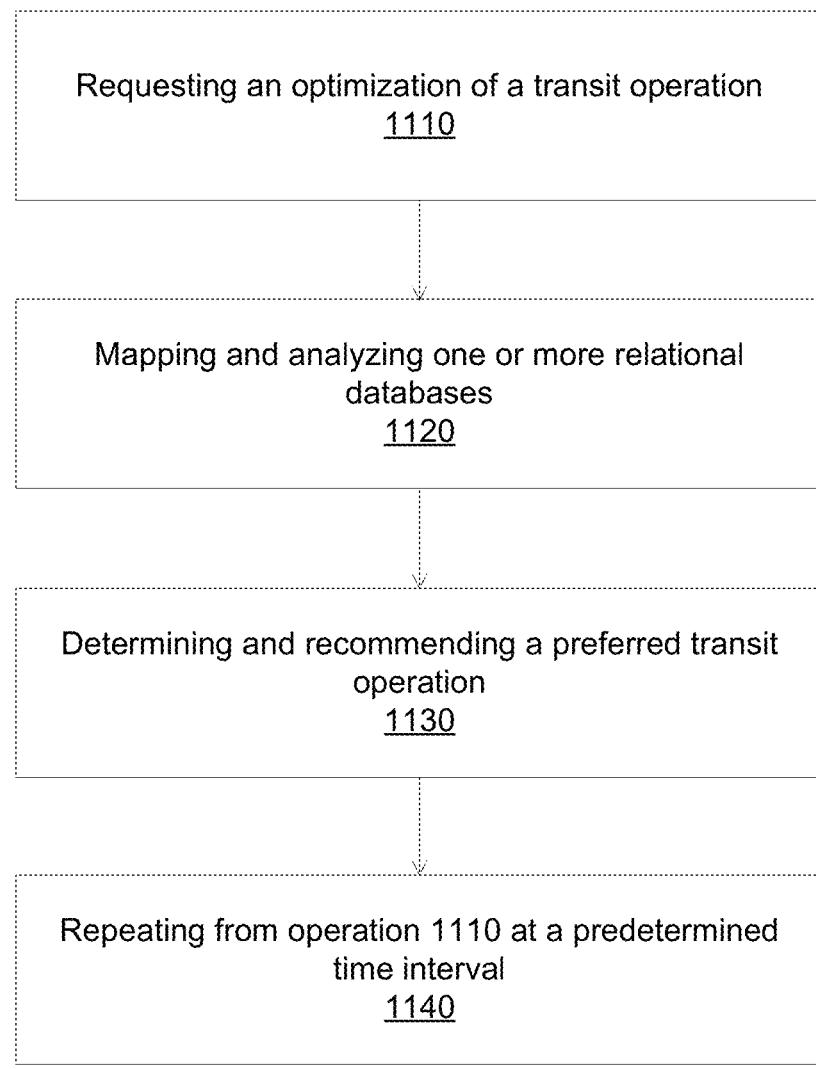
FIG. 11 illustrates an example process flowchart performed for providing an optimized transit operation, according to at least one embodiment.

FIG. 11 illustrates an example process flowchart performed for providing an optimized transit operation, according to at least one embodiment. Operation 1110 requests for an optimization of transit routes of a logistics operation based on asset compatibilities. The supply and distribution chain management server may be communicatively coupled to a GUI, allowing an administrator to inquire one or more asset recommendations for implementation in a transit operation. For example, a recommendation can be sought for each aspect and/or phase of an international delivery of materials and goods to a client location, such as, e.g., loading and unloading locations and times, driver type, vehicle type, road type, building type, and route. At operation 1120, relationships between operation units of the chain, and one or more assets associated with each of the operation units are autonomously mapped and analyzed via one or more relational databases using an algorithm. In addition, the databases may maintain information regarding associated technology asset vendors, interoperability data, rankings, and any other information that may be relevant to determine an optimal or preferred transit operation protocol, thereby avoiding compatibility issues. Operation 1130 determines and recommends a preferred transit operation that may be based on the relationships between the operation units and the corresponding assets or elements. Certain asset functions and protocols may be limited by financial constraints, operational constraints, environment constraints and geographic constraints. For example, an aerial vessel may be used in lieu of a transit function that would typically utilize a marine ship, e.g., the marine ship's operational constraint of speed may be higher, e.g., slower than that of an aerial vessel, in order to fulfill a time limit due to an environmental constraint, e.g., sudden adverse weather conditions may have slowed down the rest of the operation. Operation 1140 repeats from operation 1110 at a predetermined time interval to continually update the transit operation.

In at least one embodiment, the present invention discloses a system and a method for providing inventory location identification, and dynamic modification of transit operations or routes to alter one or more destinations of the inventory while it is in transit to a new location at any time. Dynamic modification may increase performance where it matters in the supply and distribution chain by adding flexibility into the system such that delays occurring from unexpected events are minimized. For example, an unforeseen weather event may prevent a particular asset from completing its delivery job; however, the system may autonomously and dynamically modify the route to allow for another asset not impacted by the weather event to deliver a same or similar item do the end user. Due to the rapid and fluid environment of modern warehouses and transportation services, workers often receive instructions to change the destination of inventory that has already been received and is in the process of being transferred to another location. However, once the inventory has been picked-up from its original location, it may not be possible previously to determine the vehicle used for transport and its current location until the inventory arrives at a warehouse and/or until an inventory database is updated. In a busy delivery or supply and distribution chain environment, this can result in substantial delays and inefficiencies due to the inability to rapidly locate inventory and respond to urgent stock needs or change of transfer orders.

Registrations of inventory location, e.g., in a bin or asset, may be implemented in various ways. For example, bar codes and/or RFIDs may be used to label and identify the inventory, bins and/or assets. During a pick-up or drop off of inventory, these bar codes and/or RFIDs may be scanned or read with a scanner operated by a warehouse worker and the collected data communicated, e.g., using a wireless link or a wired network, back to an inventory management system to register the location of the inventory and trigger an update to the database. Alternatively, or additionally, a warehouse operator may radio or call-in the updates to a central office where a human operator manually enters the updates into the inventory management system. Stock arriving and departing from a warehouse may also be scanned so that it is associated with an asset identifier.

A typical warehouse includes storage areas for storing inventory. The storage areas may include rows of shelves that accommodate a large number of storage bins, which are usually labeled for ease of identification. An inventory may refer to an element or quantity of stock in a facility, e.g., a warehouse, or on a vehicle, and can include items such as commercial products, e.g., books, office supplies, articles of clothing, electronic devices, home appliances, or other merchandise. In some embodiments, inventory can also include a person or group of people to be transported. By way of example, inventory may comprise any quantity or number of parts for manufacturing or providing a finished product, or any quantity or number of parts that are used for providing a service.

During normal warehouse operations, there can be many requests for different inventory items each day. In addition, inventory is often moved from one location in the warehouse to another for a variety of reasons. For example, it may be necessary to move inventory from one bin location to another, to locate certain inventory in an area for inspection, and/or to prepare for shipment outside of the warehouse. Bin identifiers may comprise a data structure or record that provides information to identify the bins for storing and locating inventory. Typically, requests to move inventory are issued as transfer orders. When a warehouse worker is given a transfer order, the worker must first locate the desired inventory. A transfer order to transfer inventory to a new location usually includes the storage location information, which is based on row and bin data retrieved from, for example, a computerized inventory management system. Once the worker has located the inventory, the worker may need to use an asset to transport to its new location. An asset may comprise any type of resource for moving or otherwise handling stock in the warehouse, such as, e.g., light and heavy capacity forklifts, conveyors, trolleys, pushcarts, as well as human operators for manually moving stock. Upon moving the stock from its current location, the worker may use a scanner to scan a bar code or RFID tag located on the inventory, and a bar code or RFID tag located on the corresponding bin. An RFID tag may comprise an internal clock, a microprocessor, memory, and at least one input interface for connecting with sensors located in the asset or a telematics device. The information is then transmitted and a database in the inventory management system is updated to indicate that the particular inventory is no longer located in the bin. Once the inventory arrives at its new location, the worker may use the scanner to update its location. For example, the worker may accomplish this by scanning the bar code or RFID tag located on the inventory and scanning the bar code or RFID tag associated with the inventory's new bin location. As a result, the database is updated to indicate that the moved inventory is now located in its new location, whether it is in the same facility as the previous location or off-site, such as, e.g., to a yard or a port.

Figure 12:
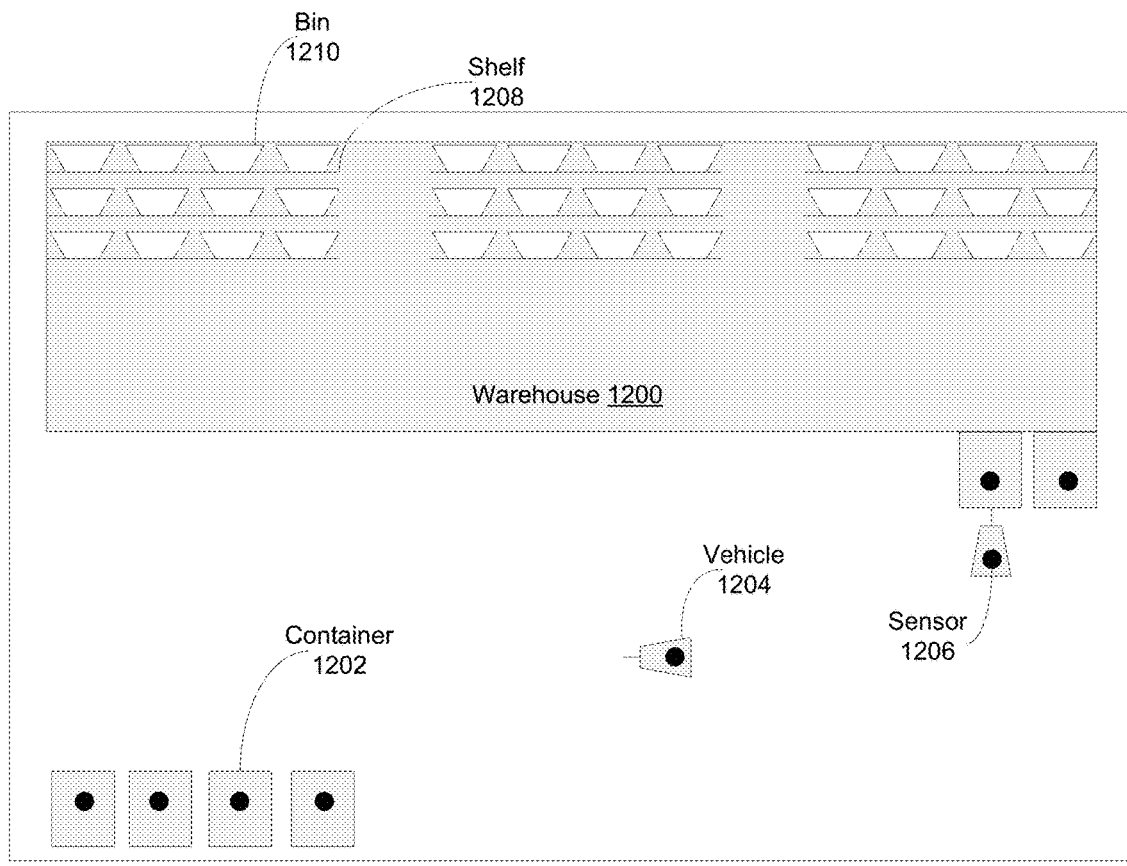
FIG. 12 is a schematic diagram of a distribution center comprising a warehouse, according to at least one embodiment.

FIG. 12 is a schematic diagram of a distribution center comprising a warehouse, according to at least one embodiment. Warehouse 1200 include one or more delivery and/or shipment area for receiving and shipping inventory, which may comprise shipping container 1202, and site vehicle 1204 used to move shipping container 1202 around the distribution center. Sensor 1206 may be associated with container 1202 and/or vehicle 1204 for gathering various data, such as, e.g., location and position. Warehouse 1200 may comprise shelf 1208 and bin 1210 for storing inventory. Both shelf 1208 and bin 1210 may be labeled for ease of identification and tracking. Labeling may be achieved through the use of any type of indicia or marking, or electronically, such as, e.g., bar code or RFID tag. Warehouse 1200 may function as the main storage facility of a supplier or merchant of goods or services, or it may be one of several storage facilities that are part of a supply chain network, and may not be a separately or remotely located storage facility, e.g., it may be co-located with a store-front or other location for selling or otherwise providing goods or services to end users.

Upon the removal of an inventory from a warehouse, the inventory management system may be updated to indicate a vehicle location and position that is being used to move the inventory and, thus, provide visibility of the inventory while it is in transit. After receiving a transfer order, the system and the method may initially associate an inventory identifier, e.g., RFID tag, belonging to a target inventory with a first location identifier belonging to the first, e.g., original, location of the inventory. During the execution of the transfer order, the inventory identifier may be associated with an asset identifier belonging to a transport vehicle or asset used to transport the inventory, which allows for visibility of the stock during its transport. When the inventory arrives at a second location, whether it is the final destination or an intermediary stop on the route, the inventory identifier may then be associated with a second location identifier belonging to the second location. As a result, this allows the system and the method the ability to monitor each step of the transit operation, and to alter the destination of the stock at any point during its transit. Such visibility and control may be advantageous because during a typical day, there may be numerous changes in transfer orders or updates to inventory deliveries.

As with the inventory and bin identifiers, asset identifiers may comprise various types or categories of data. Such data may uniquely identify an asset and may be organized into tables or any other suitable data structure. As an example, an asset identifier may include data indicating an asset ID or number, an asset name, an asset type, a user name, e.g., name or employee number of human operator, and operating data indicating the basic characteristics of the asset, e.g., maximum speed, and actual weight of the asset. Additionally, or alternatively, the asset identifier data may include status data, e.g., active or inactive. As another example, an inventory identifier may include data indicating the name or owner of the inventory and the basic characteristics of the inventory, such as, e.g., weight, volume, dimensions, shelf life or expiration date. Additionally, or alternatively, the inventory identifier data may include a stock number, an inspection or warehouse log number, a received date and/or inventory status data, e.g., free or blocked.

The inventory management system can make updates when inventory is removed from a bin or an asset. By way of example, assume there is a transfer order to move inventory from a first bin to a second bin. When a warehouse worker removes the inventory from the first bin with an asset, such as with a forklift, the registration of the pick-up may be made with the inventory management system. At this point, an update to the database will be made to associate the inventory identifier for the inventory with the asset identifier for the asset transporting the inventory. When the inventory is relocated to the second bin and registered with the inventory management system, another update may be made so that the inventory identifier is associated with a bin identifier for the second bin. To associate an inventory identifier with a bin identifier or an asset identifier, various techniques may be employed, such as, e.g., a table may be provided to associate each stock identifier with a bin identifier and an asset identifier. In some embodiments, a relational database may be maintained, wherein inventory identifiers are stored and associated with bins and assets. Each inventory identifier may be associated with a bin identifier or an asset identifier depending on its location; thus, an examination of the inventory identifier may provide visibility into the location of the inventory, e.g., stored in a bin or with an asset.

Figure 13:
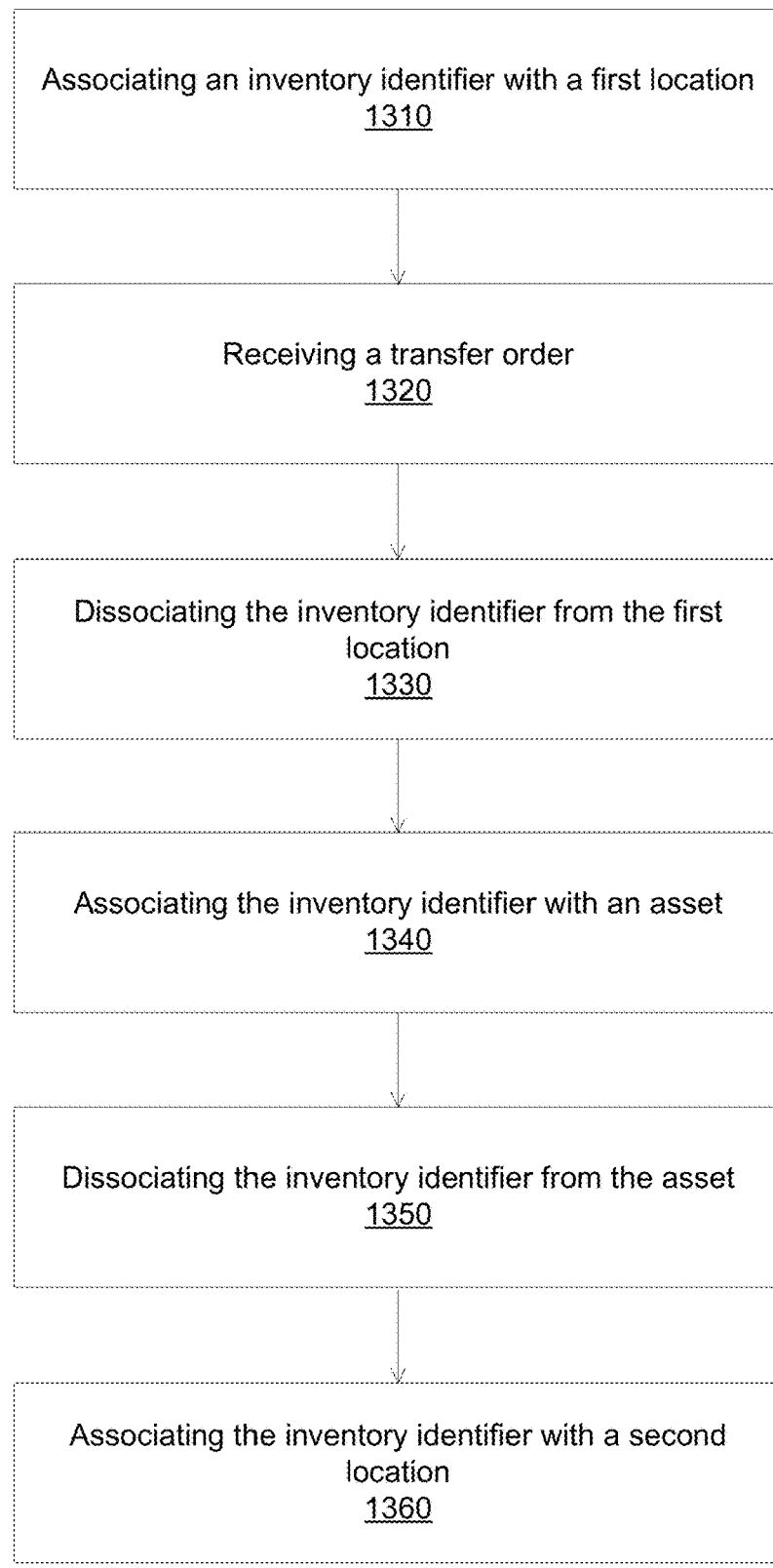
FIG. 13 is a flowchart of a method for monitoring inventory location, according to at least one embodiment.

FIG. 13 is a flowchart of a method for monitoring inventory location, according to at least one embodiment. Operation 1310 associates an inventory identifier of an inventory with a first location, such as, e.g., a bin within a storage facility. The information may be stored in a database of an inventory management system. Operation 1320 receives a transfer order to move the inventory to another location, such as, e.g., within the same facility, a different facility within a network, or a customer destination. For example, the inventory may be ordered by a customer and requires to be delivered to a customer location. Operation 1330 disassociates the inventory identifier from the first location and may update the database to indicate that the inventory is no longer at the first location. Operation 1340 associates the inventory identifier with an asset for transporting the inventory. The asset may include, e.g., trucks, trains, ships, airplanes, micro-drones, delivery drones, humanoid robots, self-driving or self-guided car robot drones. The database may be updated to indicate that the inventory is now with the asset. Operation 1350 disassociates the inventory identifier from the asset when the asset has arrived at its intended destination. Operation 1360 associates the inventory identifier with a second location. This method may allow for visibility into the inventory's location at any point during the journey of the inventory from the first location to the second location. A change in transfer order, such as, e.g., a different destination or to return to the first location, may be readily fulfilled at any time.

Alternatively, or in addition to, the system and the method above for providing visibility into an inventory's location at any point within a corresponding transit operation, a wireless tracking device or tag may be used to monitor the inventory through a network, such as, e.g., the Internet of Things (IOT). IOT may be a network of physical devices, vehicles, appliances and other items embedded with electronics, software, sensors, actuators, and network connectivity, which may enable these objects to connect and exchange data. Technologies such as Global Positioning System (GPS), Radio Frequency Identification (RFID), and General Packet Radio Service (GPRS) may track and report movements of the inventory on which the tracking device is mounted. In addition to location, the device may collect, or be coupled to an external sensor for collecting, sensory data such as for determining velocity, heading, vibration, acceleration, and data that may relate to the environment of the inventory. The autonomous electronic tracking devices may be situated in proximity to the inventory being shipped, such as, e.g., affixed or coupled to a container of the inventory such that it is securely sealing the container. The tracking device can be coupled to the container before it begins its journey and may re-couple to the container during the journey, such as, e.g., after authorized custom inspections. In some embodiments, processes relating to the inspection or acceptance of incoming inventory may be automated or autonomous, such as, e.g., using X-ray scans of inventory containers. The tracking device may be programmed to wake up periodically, collect sensory data, and to communicate with a central server, such as, e.g., sending event notifications to the server. In general, each event notification may include an identification of the event or event type, a location of the inventory when the event occurred, and additional details of the event such as a date and/or time when the event occurred, the status of the inventory before, during, or after the event, or details on the movement of the inventory, e.g., a accelerometer reading from the tracking device coupled to the container.

The tracking device may report various events, including for example, security events, environmental events, process events, and geo-tracking events. Security events may indicate whether the inventory or tracking device may have been tampered with. For example, the tracking device may report when a vertical or horizontal bolt securing the tracking device to a container is cut, indicating that the container was opened. Other types of tampers can also be detected, such as, e.g., shock intrusion or light emission within the container that exceeds a threshold. Environmental events can indicate whether one or more environmental variables, such as, e.g., temperature, humidity, vibration, and acceleration in relation to an acceptable range, such as, e.g., a recommended range for the inventory. Process events may indicate that various action or procedural events in the journey of the inventory have occurred. For example, process events may indicate that a tracking device has been attached to the container or detached from the container, e.g., that the inventory is beginning or ending its journey. Geo-tracking events may be periodic reports of the location of the tracking device. For example, the tracking device may send a report of its current location according to a schedule, such as, e.g., at fixed intervals of time. The central server may process the tracking events to determine when an inventory has entered or left a predefined area. For example, the server may define geo-fences, e.g., a virtual perimeter, around important locations along the journey of the inventory, such as, e.g., ports, and the server may determine that the inventory has entered or left a given location when the tracking device enters or leaves a geo-fence.

Figure 14:
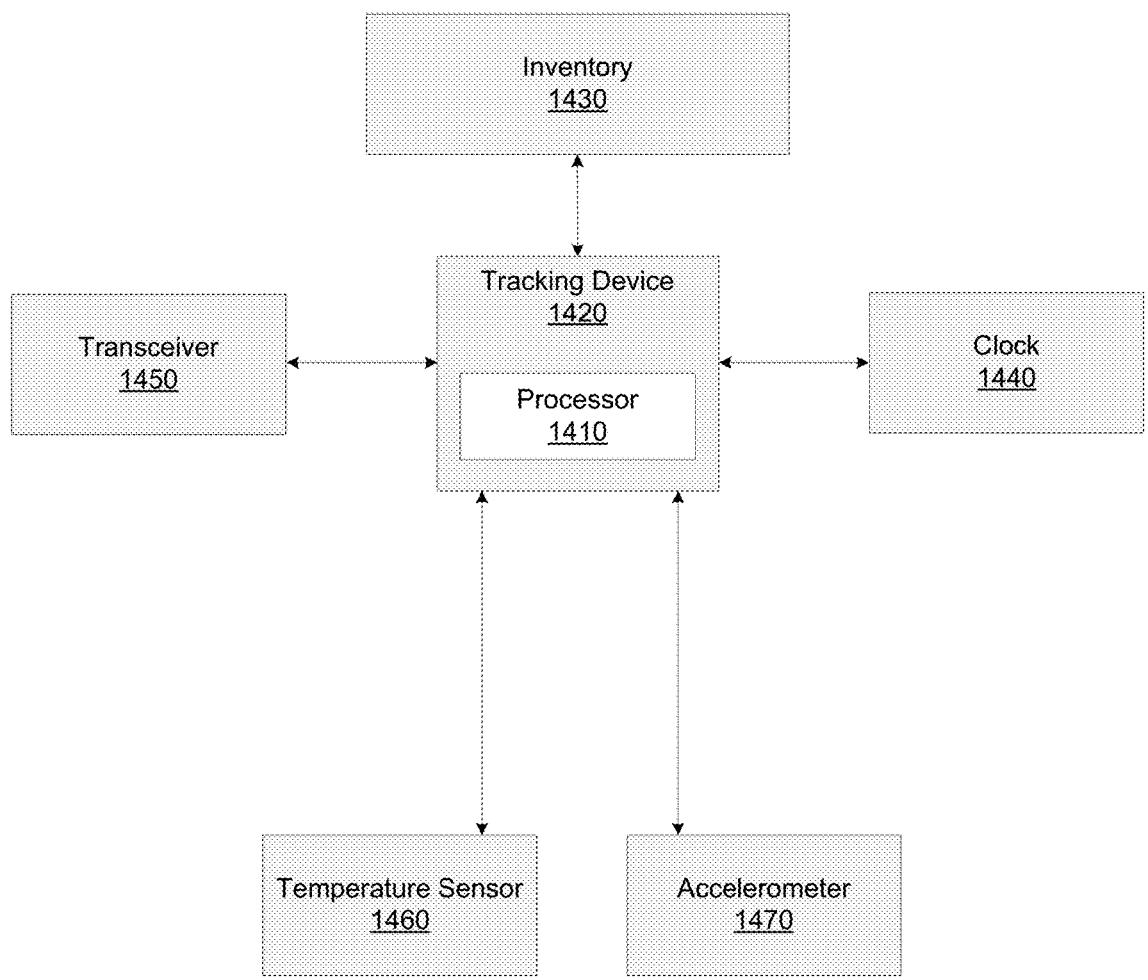
FIG. 14 is a schematic diagram of a tracking device coupled to a container of an inventory, according to at least one embodiment.

FIG. 14 is a schematic diagram of a tracking device coupled to a container of an inventory, according to at least one embodiment. A processor 1410 such as, e.g., a microprocessor or microcontroller, may control the operations of tracking device 1420 that is coupled with inventory 1430, such as, e.g., affixed to a container comprising inventory 1430. Clock 1440 may trigger transceiver 1450 to transmit or receive data on a periodic basis, such as, e.g., every 10 minutes. Processor 1410 may run on a plurality of clock 1440 such as a high speed clock may be designated for normal operation, and a slow speed clock may be used when conserving power. Communicatively coupled to processor 1410 are one or more sensors, such as, for example, temperature sensor 1460 for monitoring temperature, and accelerometer 1470 for detecting vibrations or shocks to which inventory 1430 is subjected in transit. Output signals of the sensors may be transmitted to processor 1410, which may provide analog-to-digital conversion of the signals and formatting of the data for transmission by transceiver 1450. A signal transmitted by transceiver 1450 may be received by a central server. The monitored data for various classes of inventory 1430 may not be the same. For some goods, temperature may be a critical environmental factor, and temperature sensor 1460 may therefore be provided. For goods that are sensitive to vibration or shock, accelerometer 1470 may be provided. Because sensors placed in the cargo are desirably small and inexpensive, they may be battery powered, preferably with very low average power consumption, and may remain in a sleep mode and periodically power on to transmit or receive data at periodic intervals by clock 1440.

Figure 15:
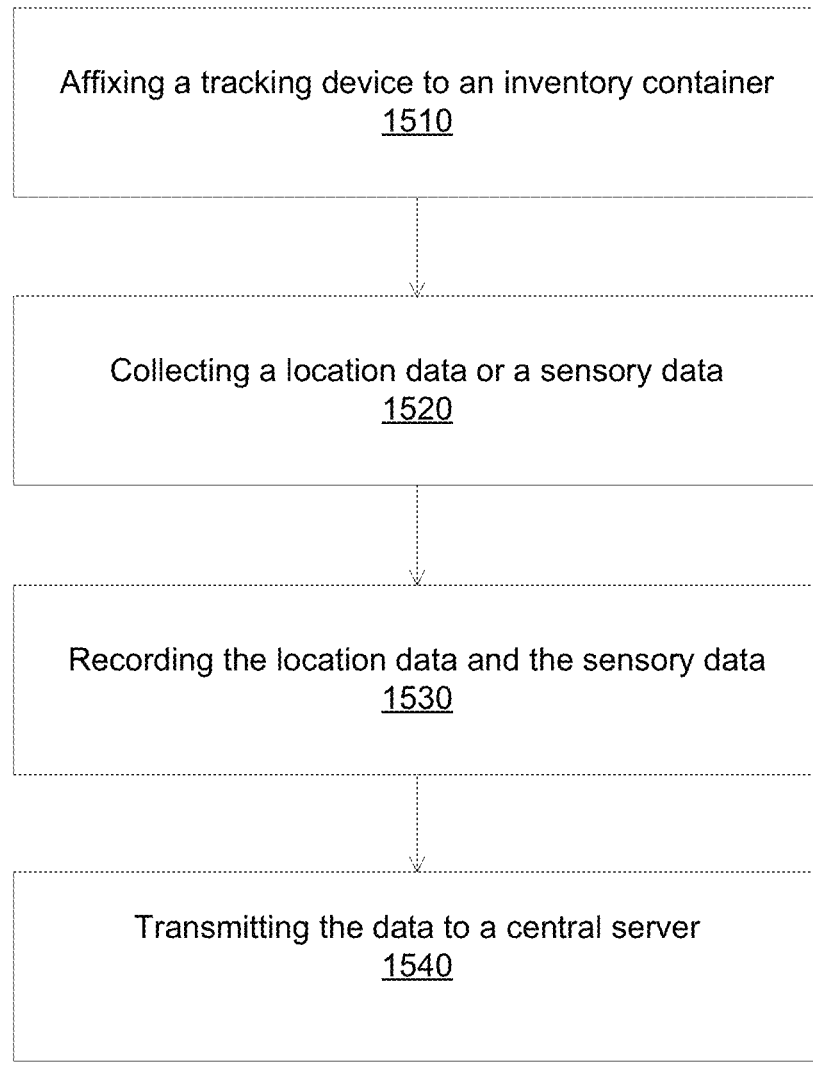
FIG. 15 is a flowchart of a method for tracking an inventory using a tracking device, according to at least one embodiment.

FIG. 15 is a flowchart of a method for tracking an inventory using a tracking device, according to at least one embodiment. Operation 1510 affixes a tracking device to a container comprising an inventory to be shipped. The tracking device may comprise, or may be communicatively coupled to, other sensors, such as, e.g., a temperature sensor or an accelerometer. Operation 1520 collects location data or sensory data of the inventory's environment from the devices. Operation 1530 records the location data and the sensory data. Operation 1540 transmits the location data and the sensory data to a central server for processing. The device may be configured to transmit or receive data at predetermined intervals, such as, e.g., every 15 minutes.

In at least one embodiment, the present invention discloses a system and a method for an autonomous supply and distribution chain management network. A supply and distribution chain may be any and all activities associated with defining, designing, producing, receiving, delivering, monitoring, storing and using the components and sub-components used in manufacturing a product. A server may control and coordinate the processes involved in distributing the product from suppliers to the customers, including generation of purchase orders and payment of invoices. Once a product is qualified, a defined set of interactions may occur in a particular sequence and at designated times that may permit the supply and distribution chain to be synchronized between a customer and a supplier. Such a well synchronized chain may comprise minimal inventories and short reaction times to efficiently handle transfer order changes. The network may comprise modules pertaining to various aspects and operations of a supply and distribution chain communicatively coupled to a centralized server, and may include, e.g., sourcing, procurement, conversion, logistic, and collaboration. The server may manage individual modules independently or simultaneously such that there is coordination in the supply and distribution chain network. For example, the supply and distribution chain network may connect actors having various roles, such as, e.g., dock workers, longshoreman, field agents, customs agents, freight forwarders, customers, suppliers, logistics providers, carriers and financial institutions. The system and the method of the present invention may create a network which supports customers requesting a same or similar product, and may realize lower costs and increased flexibility even in changing supply demands. Consider a customer X who orders supplies from suppliers A and B, but neither supplier A nor B have the inventories to meet the needs of the customer. By managing the modules centrally and simultaneously, the system may be able to determine that a supplier C has extra supplies of the same type demanded by customer X, and that another customer Y orders from either supplier B or C for their needs. The supply chain server can then automatically determine using optimization algorithms to arrange for supplier C to ship supplies to customer X so that supplier B can ship supplies to customer Y. In addition, the server may consider user-defined constraints or employ machine learning processes when determining whether to proceed with the shipping operations, such as, e.g., the ability to determine whether to arrange for supplier B to ship supplies to customer Y and supplier C to ship supplies to customer X is cost efficient.

Autonomous supply and distribution chain management may be the strategic management and integration of operations involved in the acquisition and conversion of materials to a finished product delivered to an end user, such as, e.g., a customer, without human intervention. The server may receive a customer demand, e.g., a purchase order, for direct material procurement from a customer detailing the orders that the customer may desire. In some embodiments, forecasts may be used to notify suppliers of future anticipated demands so that the suppliers can plan inventory accordingly. The supply and distribution chain server may check with one or more suppliers to determine whether the demand can be fulfilled by the suppliers. If the demand cannot be fulfilled by the suppliers, the server may contact customers and suppliers and attempt to either redistribute the customers' demands to different suppliers or request that customers alter their demands. Additionally, the customer demand may be validated to ensure that they conform with contract terms and details outlined during an initial customer set-up process, and that they do not contain errors, such as, e.g., syntax errors, missing population of mandatory fields, and incorrect customer address. Contract terms may be between any party of the supply and distribution chain, such as, e.g., customers and suppliers. For example, certain jurisdictions may comprise union labor laws that protects human workers, such as, e.g., by setting a maximum amount of work hours in a day. This validation may also include verifying whether the customer demand is complete, ensuring that every part number exists in the supply and distribution chain network, and/or that all required information is complete and accurate. If the customer demand is invalid, abnormal, or incomplete, the server may notify the customer or an external computer, network, or database system that something is wrong with their request and that a resolution process may be initiated. In response to an invalid customer demand, the server may send alerts to all potentially impacted parties, including the employees of the supply and distribution chain network. In some embodiments, the supply and distribution server may accumulate customer demands for the same or similar products prior to distribution from suppliers. By providing suppliers with a smaller number of larger orders, a more efficient process may be realized.

The system and the method may also provide global asset visibility in real-time, such as, e.g., for vehicles, facilities, personnel, real estates and other machines and structures. By having real-time visibility into the location of each ship, container, airplane, and/or truck in a single environment which may unify, aggregate, analyze, and/or optimize the supply and distribution chain, autonomous vehicles can adjust their behavior based on near instant or dynamic changes. If a ship or plane is arriving 16 hours late, the autonomous asset may minimize dwell time or idle down time by accelerating other work in the operation, while still being back in time to complete its task. In another instance of the autonomous supply and distribution chain network, certain types of vehicles can be engaged in tasks that are highly repetitive, such as, e.g., driving along a predefined path inside a city with the top sellers from an e-commerce retailer. In this situation, if an e-commerce order is received, the vehicle in the vicinity will be so close to the delivery region, that it can temporarily detour, make the autonomous delivery, and then resume the next part of its predetermined route without adverse effect to the route.

The system may either operate in a default autonomous mode whereby supply and distribution chain processes are fully automated from end-to-end without user intervention including having the ability to autonomously authorize complete cycles and automated processes of supply and distribution chain operations, or it may operate in a user-guided semi-autonomous mode. The user-guided semi-autonomous mode may be used to, e.g., override certain processes or procedures, check for availability of assets, maintain visual inspection, and/or troubleshoot assets and operations. The user may interact through a graphical user interface, such as, e.g., a virtual or augmented reality environment, or through a voice-activated personal assistant. Similar to a human body's autonomous nervous system unconsciously controlling vital organs and biological functions while responding to stimuli, the autonomous system and method of the present invention may respond and adapt to dynamic supply and distribution chain demands in real-time. The system may provide automated functions that may accelerate or decelerate the logistics supply pipeline by either speeding up or slowing down the various operations within downstream processes and their corresponding modules, while eliminating or automating many of the labor-intensive and time-consuming operations required in legacy systems. A graphical user interface may be communicatively coupled to the server and may provide interactive control to one or more users of the network. In some embodiments, a supply and distribution chain simulator may be used to help user management to make strategic decision. The simulator may mimic different aspects in the chain, such as, e.g., demands, supplies, inventories, manufactures and transportation, before the operation is actually conducted. The user may view the predicted outcome of a given operation and may adjust parameters of the operation to further improve the performances or to avoid complications.

Figure 16:
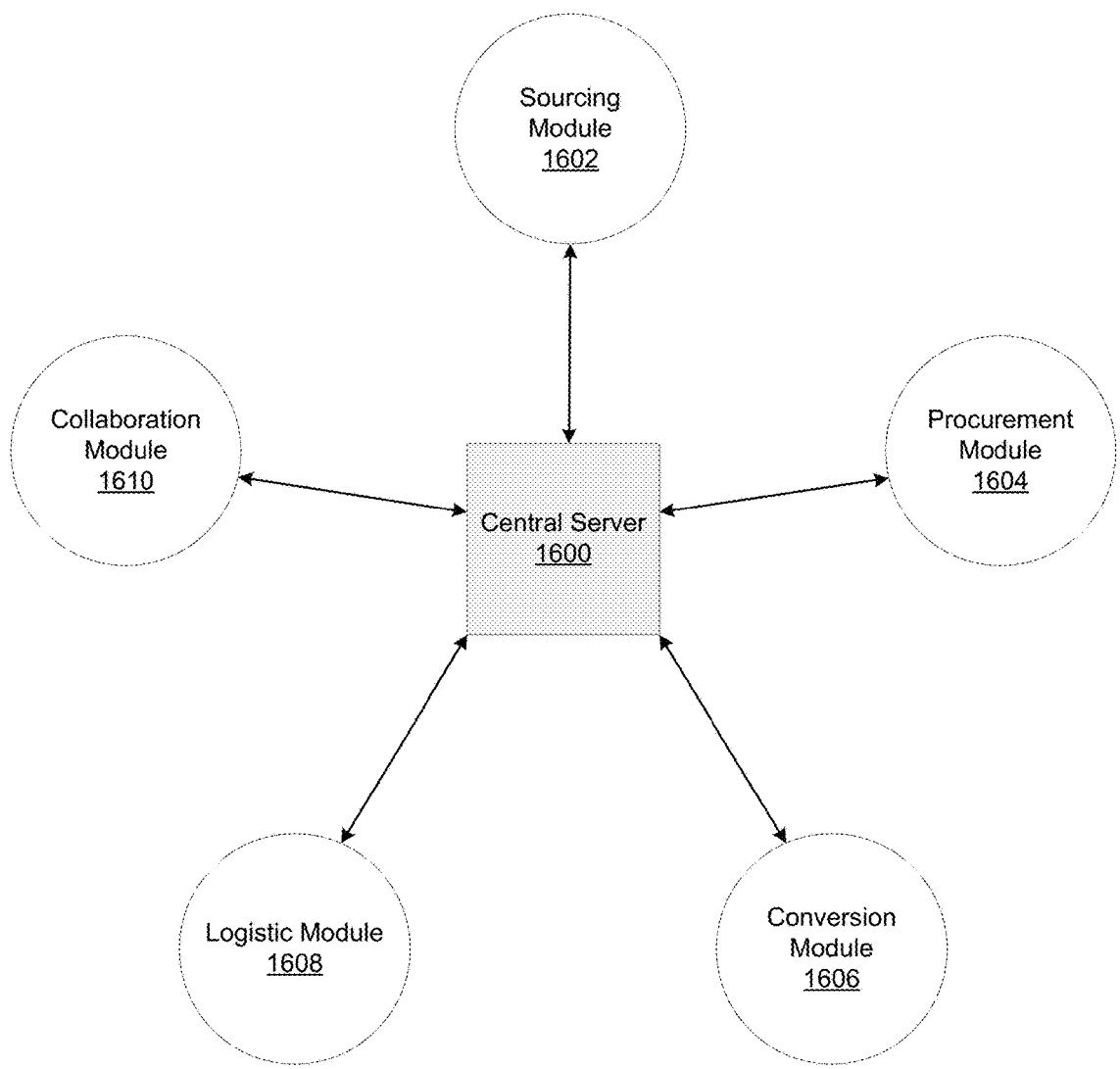
FIG. 16 illustrates a supply chain management network, according to at least one embodiment.

FIG. 16 illustrates a supply and distribution chain management network, according to at least one embodiment. The network may comprise a central server 1600, which may control and coordinate processes involved in distributing a product from suppliers to customers and may include the generation of purchase orders and invoices. Central server 1600 may be communicatively coupled to a sourcing module 1602, a procurement module 1604, a conversion module 1606, a logistic module 1608, and a collaboration module 1610. Unlike prior art system that manages the functions of these modules independently without communication with one another, the modules of the present invention may autonomously operate concurrently to provide supply and distribution chain functions, such as, warehouse management, e.g., inventory analysis, cost optimization, space utilization analysis, barcode tracking for inventory and material, order management, information management, future expense prediction, demand shaping capabilities, and documentation accuracy verification; customer order management, e.g., revenue analysis, order information accuracy analysis, backorder reporting, order dispatch accuracy measurement, and delivery error rate; and reverse logistics management, e.g., analysis of reasons for returns, analysis of return delivery time, and value of returns.

Sourcing module 1602 may identify, evaluate, and contract suppliers for parts and/or services upon receipt of a demand. Procurement module 1604 may execute the purchasing process, such as, e.g., acquire supplies, raw materials, parts and/or services by executing the contracts with the preferred suppliers and to autonomously achieve one or more goals as defined by the system. Based on forecasted demand, suppliers can accurately anticipate customer demand, and plan their procurement and production processes accordingly. As a result, suppliers may avoid unnecessary purchases of raw materials, eliminate manufacturing over-runs, prevent the need to store excess goods, allow for confidently receiving a supplier's products ahead of a designated schedule, or reduce prices to move products off of warehouse shelves. Suppliers may also minimize excess capacity and capabilities by dynamically adjusting its resources based on actual or predicted requirements of market demands. Conversion module 1606 may build, repair or customize demanded goods from the parts and/or services acquired by procurement module 1604.

Logistic module 1608 may be involved in planning, implementing and controlling the transport and storage of goods and services from the point of origin to a logistics company, and from the company to a point of consumption, such as, e.g., an end user. Logistic module 1608 may provide complete visibility into how finished goods are stored and distributed, such as, e.g., adherence to global trade compliances, replenishment planning, order processing, transportation, security, fleet management, reverse-logistics, returns, and route planning. It may operate within one company or multiple companies to manage the transport of a product from the supplier to the end user, such as, e.g., to automate load balancing of shipment cargos, coordinate a plurality of warehouses and transportation channels, and provide travel route analysis. Collaboration module 1610 may coordinate with channel partners to design, customize, and implement solutions that match the customer demand. For example, the system and the method of the present invention may allow business partners to collaborate through a central server of the supply and distribution chain, which may provide benefits of leveraging resources, such as, e.g., operation units and assets, and to share business knowledge and databases of suppliers and customers. The server may provide the various functions to each partner, such as, e.g., adding or deleting partners, changing parameters of its own supply and distribution chain such as, e.g., inventory and assets, and may designate authority over other partners in the chain through agreements, such as, e.g., to have one partner chosen as a dominant partner with broader authority than the rest. Each partner may be able to configure their own supply and distribution chain profile to decide the data that is viewable or modifiable by their chosen partners, such as, e.g., through setting of a level of privilege on the data to be shared with the partners, and to clearly define the extent of the collaboration. By having a joint operation, all parties can receive current information concerning shipment of inventory to customers, and may provide the benefits of being more cost-effective, efficient, and responsive to dynamic market needs.

Figure 17:
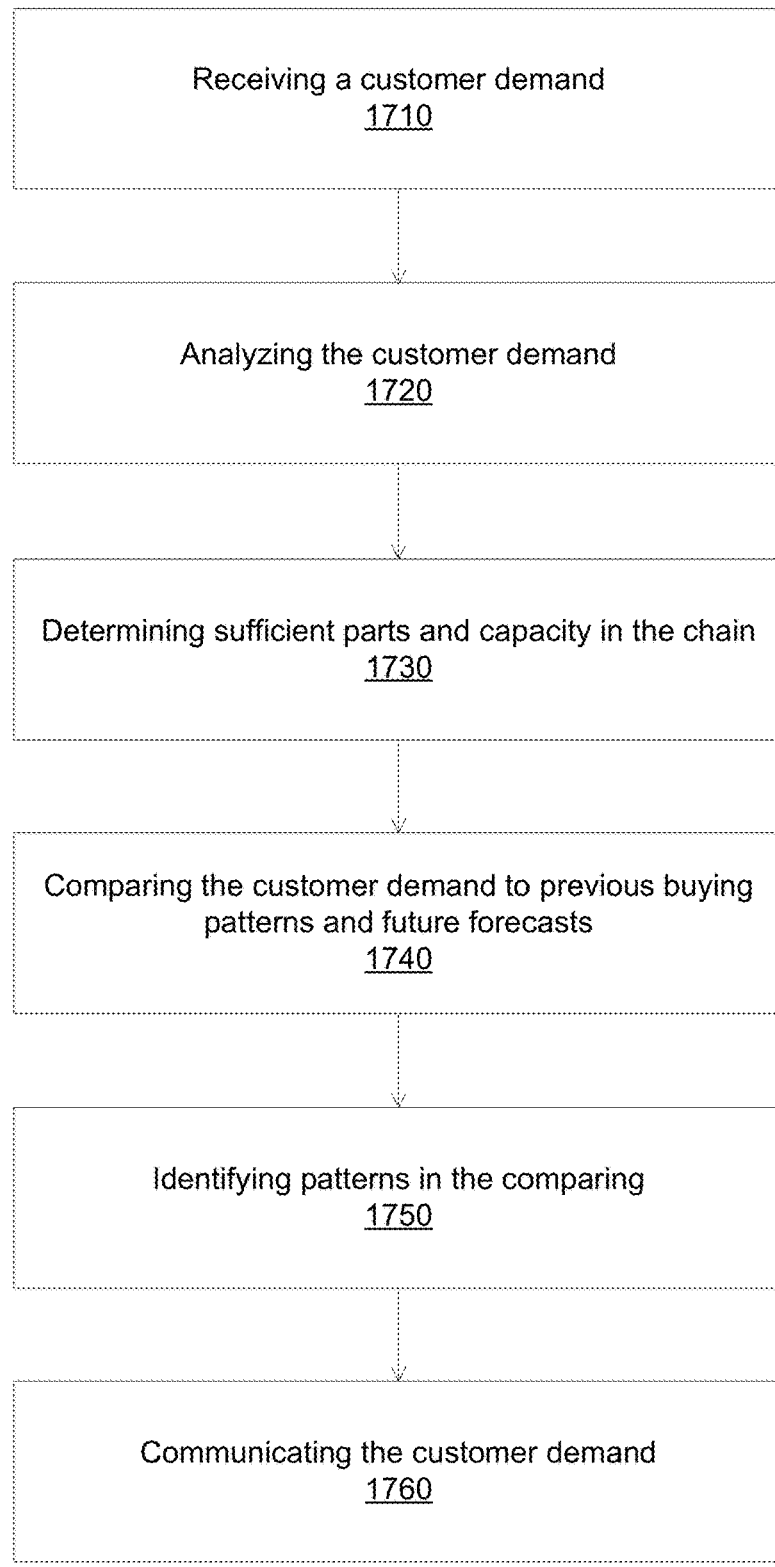
FIG. 17 is a flowchart of a method for processing customer demand for direct material, according to at least one embodiment.

FIG. 17 is a flowchart of a method for processing customer demand for direct material, according to at least one embodiment. Operation 1710 receives a customer demand, e.g., a purchase order, for procurement of direct material to be used for manufacture of a product from a customer through a central server. The server may convert the demand into a standard format used to analyze the demand. Operation 1720 analyzes the customer demand to determine whether it is valid, such as, e.g., whether it is complete, accurate, and complies with contract terms. Operation 1730 determines whether every part number exists in the supply and distribution chain and whether the customer demand adheres to agreed-to capacities. This may allow the server to effectively meet all customer demands within suppliers' capacity constraints. For example, if customer demand is not greater than capacity, the server may proceed to the next step in the chain. Operation 1740 compares the customer demand to previous buying patterns and future forecasts from the same customer or a different customer. Operation 1750 identifies one or more patterns in the comparison, such as, e.g., whether the demand adheres to a previous buying pattern or a future forecast. Operation 1760 communicates the demand to a supplier if the demand is valid. Once customer demand is fulfilled, rules and activities used in performing financial transactions such as billing and processing of customer payments may be used. If a customer decides to return a product procured through supply and distribution chain network, a determination may be made whether the supplier has replacement parts in inventory, and whether the customer needs a replacement immediately, or if the replacement part demand can be added to an existing queue or forecast. If the customer needs the replacement part immediately, the supplier's available inventory may be a primary source; otherwise a different supply with a same or similar product from within the network is used.

Thus, by providing a supply and distribution chain server to handle many of the processes previously performed by individual entities of the prior art, a more efficient and cost minimizing architecture may be realized. By consolidating the many functions of the chain, activities and tasks can be fully automated and streamlined across a company's entire supplier network, and many of the steps and costs expended by customers and suppliers of prior art supply chains are eliminated. As a result, retailers can build stronger relationships with vendors, better assess and manage their performance, improve negotiations to leverage volume or bulk discounts and other cost-cutting measures, appreciate lower expenses for freight, operate faster and more reliable deliveries, and have access to complete supply and distribution chain visibility. Suppliers may benefit from lower expenses, lower planning and production costs, lower inventory, improved deliveries, visibility of demand, lower operating expenses, and reduced manufacturing costs from smoother production flows. This all leads to improved profitability while selling at lower prices which, in turn, may increase demand and thus creating an upward spiral of events. Both customers and suppliers may have access to a secure web site hosted by a supply and distribution chain server that may provide valuable information that may not have been available in the prior art, such as, e.g., customer buying habits, and the size and growth rates of markets served.

Although demand and supply of products have been discussed, it should be clear that demand and supply of any resource, including services, is also within the scope of the invention. The term "product" throughout the specification thus refers to any such resource or service. For example, customers could be individuals desiring bandwidth on a connection line in a network. Suppliers would then be sources of network bandwidth. Customers could also be, for example, individuals desiring airplane tickets or theater seats from corresponding suppliers. A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium, and/or may be performed in any order. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A machine-implemented method, comprising:
   coordinating at least one of a sourcing procedure, a procurement procedure, a conversion procedure, a logistic procedure, and a collaboration procedure,
   wherein the coordinating is of an autonomous mode or a semi-autonomous mode,
   wherein the autonomous mode does not include operator intervention,
   wherein the semi-autonomous mode permit operator intervention;
   receiving a customer demand;
   analyzing the customer demand to determine whether the customer demand is valid, wherein a valid customer demand comprises compliance with a contract term;
   determining inventory within supplier capacity;
   receiving an asset's telematics data;
   calculating duration for one or more destinations; calculating estimated arrival times of the destinations; and
   determining one or more routes to the destinations based on at least one of an asset compatibility data, a financial constraint, an environment constraint and a geographic constraint;
   wherein the route comprises assets arriving at a bottleneck location at a predetermined interval for preventing delays at the bottleneck location, and wherein the bottleneck location comprises a multi-modal facility.

2. The method of claim 1, further comprising:
   wherein the asset compatibility data comprises operational constraints, and
   wherein the operational constraints comprise a driver constraint, a vehicle constraint, a road constraint, a building constraint, and an environmental constraint.

3. The method of claim 1, further comprising:
   wherein the asset compatibility data comprises mapping and analyzing one or more relational databases.

4. The method of claim 1, further comprising:
   wherein determining the route comprises assigning the one or more destinations to the asset based on the duration of the one or more destinations.

5. The method of claim 1, further comprising:
   re-routing the asset to a remaining assigned or unassigned destination after completion of each destination based on data of the remaining destination.

6. The method of claim 1, further comprising:
   continually receiving the asset's telematics data, calculating duration for one or more destinations, calculating estimated arrival times of the destinations, determining a delivery route to the destinations at predetermined intervals; and altering the one or more destinations of the route while the route is in progress.

7. The method of claim 1, further comprising:

incorporating a business intelligence data into the determining of the route, and wherein the business intelligence data comprises an additional amount of risk and cost data.

8. The method of claim 1, further comprising:

using artificial intelligence to determine underperforming assets based on the telematics data.

* * * * *